(12) United States Patent
Ding et al.

(10) Patent No.: US 11,523,209 B1
(45) Date of Patent: Dec. 6, 2022

(54) METHOD AND SYSTEM FOR HEADSET WITH WIRELESS AUXILIARY DEVICE

(71) Applicant: Logitech Europe S.A., Lausanne (CH)

(72) Inventors: Rong-Hwa Ding, HsinChu (TW); Tommy Chun Wah Ho, HsinChu (TW)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 17/386,077

(22) Filed: Jul. 27, 2021

(51) Int. Cl.
*H04R 1/10* (2006.01)
*H04W 76/10* (2018.01)

(52) U.S. Cl.
CPC ......... *H04R 1/1041* (2013.01); *H04R 1/1016* (2013.01); *H04R 1/1091* (2013.01); *H04W 76/10* (2018.02); *H04R 2420/07* (2013.01)

(58) Field of Classification Search
CPC .. H04R 1/1041; H04R 1/1016; H04R 1/1091; H04W 76/10
See application file for complete search history.

(56) References Cited

U.S. PATENT DOCUMENTS

| 10,412,567 | B1 * | 9/2019 | Tong | H04W 76/10 |
|---|---|---|---|---|
| 11,172,101 | B1 * | 11/2021 | Boozer | H04N 5/23241 |
| 11,197,142 | B1 * | 12/2021 | Kontopidis | H04R 1/10 |
| 2018/0091887 | A1 * | 3/2018 | Minoo | H04R 1/1025 |
| 2019/0075385 | A1 * | 3/2019 | Lee | H02J 7/0045 |
| 2020/0266640 | A1 * | 8/2020 | Valenzuela | H02J 7/0044 |
| 2020/0336820 | A1 * | 10/2020 | Tasaka | H04N 5/76 |

\* cited by examiner

*Primary Examiner* — Simon King
(74) *Attorney, Agent, or Firm* — Kilpatrick Townsend & Stockton LLP

(57) ABSTRACT

In one example, an apparatus comprises a headset and an auxiliary device. The headset includes a first microphone to detect first egress audio signals and a speaker to output ingress audio signals received wirelessly from a mobile device. The auxiliary device includes a container to hold the headset, as well as a second microphone to detect second egress audio signals. In a first operation mode, one of the headset or the auxiliary device can transmit wireless signals including the first egress audio signals to the mobile device. In a second operation mode, one of the headset or the auxiliary device can transmit wireless signals including the second egress audio signals to the mobile device.

20 Claims, 21 Drawing Sheets

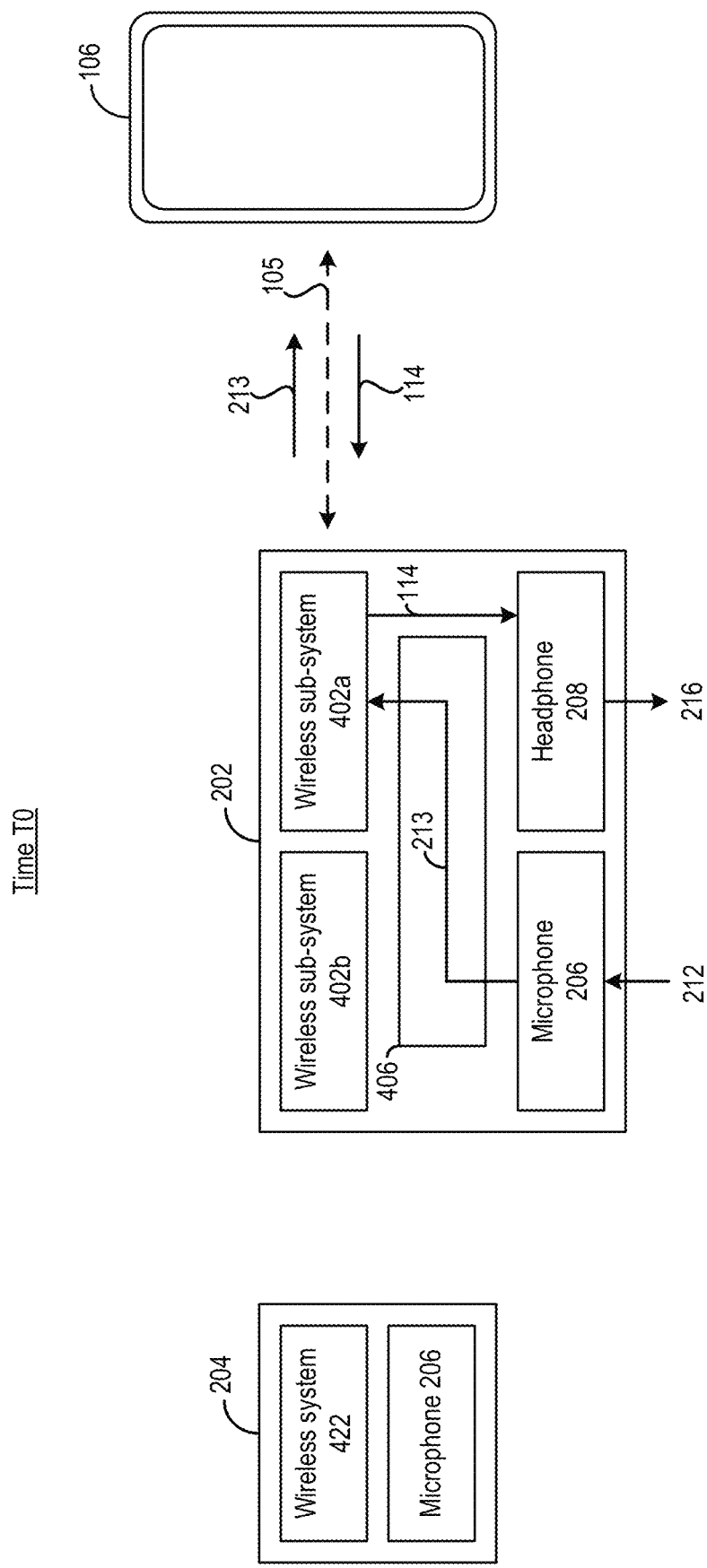

700 →

```
┌─────────────────────────────────────────────────────────────────────┐
│ receiving, using a first wireless system of a headset, ingress audio│─ 702
│ data, the ingress audio data being originated at a mobile device    │
└─────────────────────────────────────────────────────────────────────┘
                                    ↓
┌─────────────────────────────────────────────────────────────────────┐
│ Outputting, using a headphone of the headset, ingress audio signals │─ 704
│ based on the ingress audio data                                     │
└─────────────────────────────────────────────────────────────────────┘
                                    ↓
┌─────────────────────────────────────────────────────────────────────┐
│ receiving, by a first microphone of the headset, first egress audio │─ 706
│ signals                                                             │
└─────────────────────────────────────────────────────────────────────┘
                                    ↓
┌─────────────────────────────────────────────────────────────────────┐
│ Converting, by the first microphone, the first egress audio signals │─ 708
│ to first egress audio data                                          │
└─────────────────────────────────────────────────────────────────────┘
                                    ↓
┌─────────────────────────────────────────────────────────────────────┐
│ receiving, using a second microphone of an auxiliary device, second │─ 710
│ egress audio signals, the auxiliary device further including a      │
│ container to hold the headset                                       │
└─────────────────────────────────────────────────────────────────────┘
                                    ↓
┌─────────────────────────────────────────────────────────────────────┐
│ Converting, by the second microphone, the second egress audio       │─ 712
│ signals to second egress audio data                                 │
└─────────────────────────────────────────────────────────────────────┘
                                    ↓
┌─────────────────────────────────────────────────────────────────────┐
│ Operating at least one of the headset or the auxiliary device in a  │
│ first operation mode, comprising:                                   │
│                                                          ┌─714a     │
│  ┌───────────────────────────────────────────────────┐             │
│  │ Selecting the first egress audio signals for      │             │─ 714
│  │ transmission to the mobile device                 │             │
│  └───────────────────────────────────────────────────┘             │
│                                                          ┌─714b     │
│  ┌───────────────────────────────────────────────────┐             │
│  │ Transmitting, using one of the first wireless     │             │
│  │ system of the headset or a second wireless system │             │
│  │ of the auxiliary device, the first egress audio   │             │
│  │ data to the mobile device                         │             │
│  └───────────────────────────────────────────────────┘             │
└─────────────────────────────────────────────────────────────────────┘
                                    ↓
┌─────────────────────────────────────────────────────────────────────┐
│ Operating at least one of the headset or the auxiliary device in a  │
│ second operation mode, comprising:                                  │
│                                                          ┌─716a     │
│  ┌───────────────────────────────────────────────────┐             │
│  │ Selecting the second egress audio signals for     │             │─ 716
│  │ transmission to the mobile device                 │             │
│  └───────────────────────────────────────────────────┘             │
│                                                          ┌─716b     │
│  ┌───────────────────────────────────────────────────┐             │
│  │ Transmitting, using one of the first wireless     │             │
│  │ system of the headset or a second wireless system │             │
│  │ of the auxiliary device, the second egress audio  │             │
│  │ data to the mobile device                         │             │
│  └───────────────────────────────────────────────────┘             │
└─────────────────────────────────────────────────────────────────────┘
```

FIG. 7

METHOD AND SYSTEM FOR HEADSET WITH WIRELESS AUXILIARY DEVICE

A headset is a hardware device that connects to another device, such as a phone or a computer. A headset includes a microphone and a headphone, allowing the user to talk to and listen to other parties via the connected device while keeping their hands free. Headsets are used extensively in many applications, such as real-time communication, gaming, audio/video applications, etc.

One key performance index of a headset for communication applications is microphone speech quality, which can measure the quality of speech audio signals of the intended speaker (e.g., the user of the headset) detected by the microphone. The quality of speech audio signals can be determined by how well the headset reduces the environment noise components present in the speech audio signals. There are various sources of environment noises, such as fan noise, engine noise, speech from other speakers, traffic noises in the streets, etc., which should be suppressed to allow parties of the communication applications to listen to the speaker's speech with a high fidelity.

BRIEF SUMMARY OF THE INVENTION

In some examples, an apparatus is provided. The apparatus includes a headset and an auxiliary device. The headset includes: a first wireless system configured to transmit first egress audio data, and to receive ingress audio data, the ingress audio data being originated at a mobile device; a first microphone configured to receive first egress audio signals, and to convert the first egress audio signals to the first egress audio data; and a headphone configured to output ingress audio signals based on the ingress audio data. The auxiliary device includes: a container configured to hold the headset; a second wireless system configured to transmit second egress audio data; and a second microphone configured to receive second egress audio signals, and to convert the second egress audio signals to the second egress audio data. The apparatus is configured to, in a first operation mode: select the first egress audio signals for transmission to the mobile device; and transmit, using the first wireless system of the headset or the second wireless system of the auxiliary device, the first egress audio data to the mobile device. The apparatus is configured to, in a second operation mode: select the second egress audio signals for transmission to the mobile device; and transmit, using one of the first wireless system of the headset or the second wireless system of the auxiliary device, the second egress audio data to the mobile device.

In some aspects, the headset comprises a pair of ear buds.

In some aspects, the headset is configured to establish a two-way wireless connection with the mobile device using the first wireless system. The apparatus further includes an operation mode selection circuit configured to: in the first operation mode, forward the first egress audio data to the first wireless system of the headset to transmit the first egress audio data to the mobile device via the two-way wireless connection; and in the second operation mode, forward the second egress audio data to the first wireless system of the headset to transmit the second egress audio data to the mobile device via the two-way wireless connection.

In some aspects, the headset is configured to: establish a one-way wireless connection with the auxiliary device using the first wireless system; and receive, via the one-way wireless connection, the second egress audio data.

In some aspects, the two-way wireless connection is based on a first wireless protocol; and the one-way wireless connection is based on a second wireless protocol.

In some aspects, the operation mode selection circuit of the headset is configured to determine to operate in the second operation mode based on the first wireless system receiving the second egress audio data via the one-way wireless connection.

In some aspects, the headset includes an input interface configured to detect an action from a user of the headset. The operation mode selection circuit is configured to determine whether to operate in the first operation mode or in the second operation mode based on the detected action.

In some aspects, the input interface comprises at least one of: a mechanical button, or a touch interface.

In some aspects, the operation mode selection circuit is configured to determine whether to operate in the first operation mode or in the second operation mode based on identifying a voice command in the first egress audio data or the second egress audio data.

In some aspects, the operation mode selection circuit is a first operation mode selection circuit. The auxiliary device further includes a second operation mode selection circuit configured to: in the first operation mode, disable at least one of: the reception of the second egress audio signals by the second microphone, or the transmission of the second egress audio data by the second wireless system; and in the second operation mode, enable the reception of the second egress audio signals by the second microphone, and enable the transmission of the second egress audio data by the second wireless system.

In some aspects, the auxiliary device includes an input interface configured to detecting an action from a user of the headset. The second operation mode selection circuit is configured to determine whether to operate in the first operation mode or in the second operation mode based on the detected action.

In some aspects, the input interface comprises at least one of: a mechanical button, or a touch interface.

In some aspects, the auxiliary device includes a gyroscope to determine an orientation of the second microphone. The second operation mode selection circuit is configured to determine whether to operate in the first operation mode or in the second operation mode based on the orientation of the second microphone.

In some aspects, the auxiliary device is configured to: establish a first two-way wireless connection with the mobile device, and a second two-way wireless connection with the headset, using the second wireless system; and receive the first egress audio data from the headset via the second two-way wireless connection. The auxiliary device comprises an operation mode selection circuit configured to: in the first operation mode, forward the first egress audio data to the second wireless system of the auxiliary device to transmit the first egress audio data to the mobile device via the first two-way wireless connection; and in the second operation mode, forward the second egress audio data to the second wireless system of the auxiliary device to transmit the second egress audio data to the mobile device via the first two-way wireless connection.

In some aspects, the auxiliary device is configured to: receive the ingress audio data from the mobile device via the first two-way wireless connection; and transmit the ingress audio data to the headset via the second two-way wireless connection.

In some aspects, the auxiliary device includes an input interface configured to detecting an action from a user of the headset, the input interface comprising at least one of: a mechanical button, or a touch interface. The operation mode selection circuit is configured to determine whether to operate in the first operation mode or in the second operation mode based on the detected action.

In some aspects, the first two-way wireless connection and the second two-way wireless connection are based on different protocols.

In some examples, a method is provided. The method comprises: receiving, using a first wireless system of a headset, ingress audio data, the ingress audio data being originated at a mobile device; outputting, using a headphone of the headset, ingress audio signals based on the ingress audio data; receiving, by a first microphone of the headset, first egress audio signals; converting, by the first microphone, the first egress audio signals to first egress audio data; receiving, using a second microphone of an auxiliary device, second egress audio signals, the auxiliary device further including a container to hold the headset; and converting, by the second microphone, the second egress audio signals to second egress audio data. The method further comprises: operating at least one of the headset or the auxiliary device in a first operation mode, comprising: selecting the first egress audio signals for transmission to the mobile device; and transmitting, using one of the first wireless system of the headset or a second wireless system of the auxiliary device, the first egress audio data to the mobile device. The method further comprises: operating the at least one of the headset or the auxiliary device in a second operation mode, comprising: selecting the second egress audio signals for transmission to the mobile device; and transmitting, using the one of the first wireless system of the headset or the second wireless system of the auxiliary device, the second egress audio data to the mobile device.

In some aspects, the method further comprises: receiving, using the first wireless system of the headset, the second egress audio data from the auxiliary device. Operating at least one of the headset or the auxiliary device in the first operation mode comprises forwarding, using an operation mode selection circuit of the headset, the first egress audio data to the first wireless system of the headset, to transmit the first egress audio data to the mobile device. Operating at least one of the headset or the auxiliary device in the second operation mode comprises forwarding, using the operation mode selection circuit of the headset, the second egress audio data to the first wireless system of the headset, to transmit the second egress audio data to the mobile device.

In some aspects, the method further comprises: receiving, using the second wireless system of the auxiliary device, the first egress audio data from the headset. Operating at least one of the headset or the auxiliary device in the first operation mode comprises forwarding, using an operation mode selection circuit of the auxiliary device, the first egress audio data to the second wireless system of the auxiliary device, to transmit the first egress audio data to the mobile device. Operating at least one of the headset or the auxiliary device in the second operation mode comprises forwarding, using the operation mode selection circuit of the auxiliary device, the second egress audio signals to the second wireless system of the auxiliary device, to transmit the second egress audio data to the mobile device.

BRIEF DESCRIPTION OF THE DRAWINGS

The detailed description is set forth with reference to the accompanying figures.

FIG. 5A, FIG. 5B, and FIG. 5C illustrate examples of a sequence of operations of the examples of headset and auxiliary device of FIG. 2A-FIG. 2C, according to some embodiments.

FIG. 7 illustrates examples of a method of operating a headset and a wireless auxiliary device, according to some embodiments.

DETAILED DESCRIPTION OF THE INVENTION

Figure 1A:
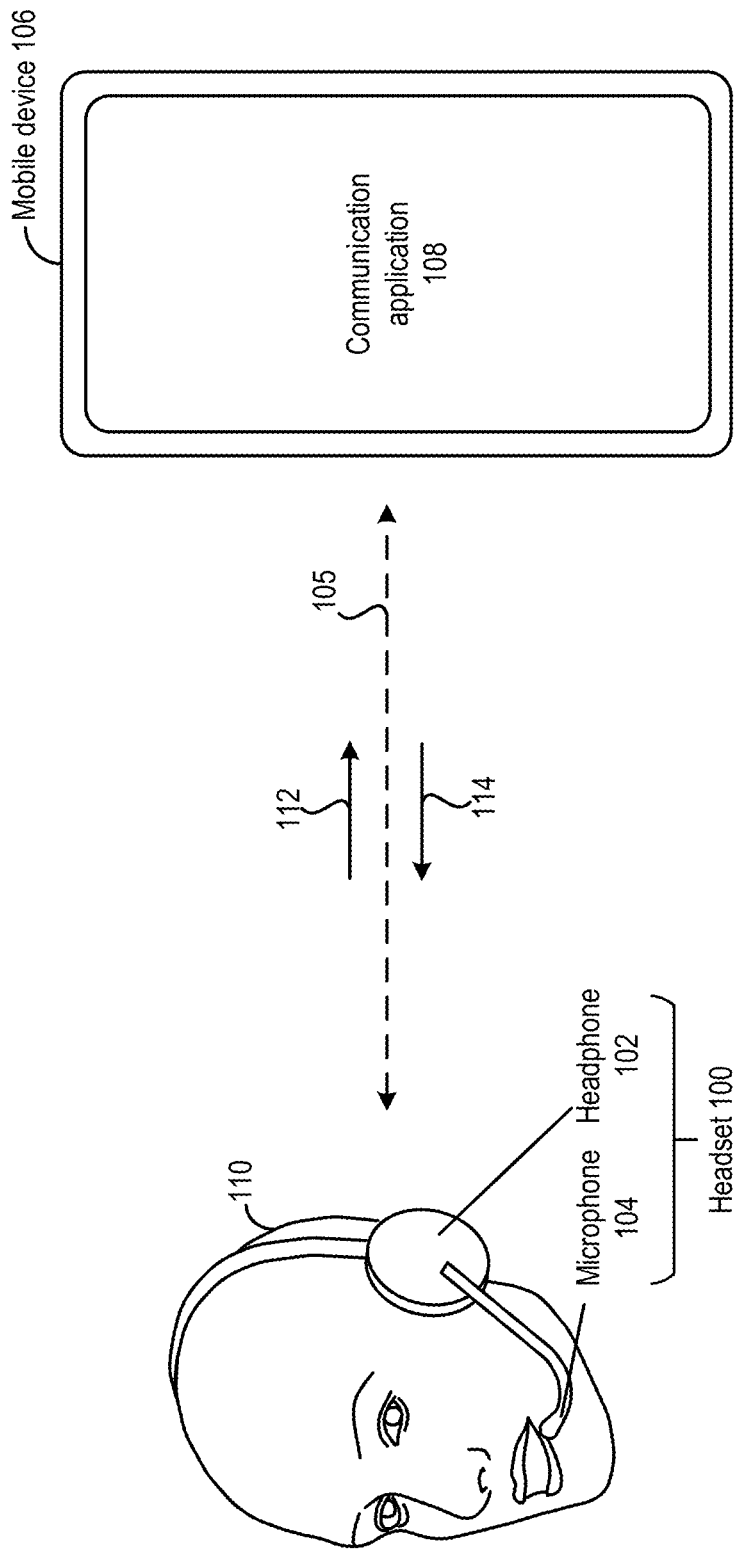
FIG. 1A, FIG. 1B, FIG. 1C, and FIG. 1D illustrate example techniques of headset noise reduction.

Aspects of the present disclosure relate generally to a wearable peripheral device, and in particular to a headset and a wireless auxiliary device, according to certain examples. Both of the headset and the auxiliary device includes one or more microphones. Depending on the operation conditions, audio signals generated by the microphones of one of the headset or the auxiliary device can have smaller noise components and can be selectively transmitted to a connected device (e.g., a phone, a computer, etc.) to improve the speech quality of the audio signals.

In the following description, various examples of a headset and a wireless auxiliary device will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

As described above, a headset typically includes a microphone and a headphone, allowing the user to talk to and listen to other parties via a connected device while keeping their hands free. Headsets are used extensively in many applications, such as real-time communication, gaming, audio/video applications, etc. One key performance index of a headset for communication applications is microphone speech quality, which can measure the quality of speech audio signals of the intended speaker (e.g., the user of the headset, or other speakers) detected by the microphone. The quality of speech audio signals can be determined by how well the headset reduces the environment noise components present in the speech audio signals.

There are various sources of environment noises, such as fan noise, engine noise, speech from other speakers, traffic noises in the streets, etc. The environment noises can come from different directions and can have different intensities. The environment noises can be picked up by the microphone of the headset, together with the speech of the intended speaker, such that the audio signals detected by the microphone include both the environment noises and the speech of the intended speaker. The environment noises should be suppressed to allow parties of the communication applications to listen to the speaker's speech with a high fidelity.

One way to reduce the environment noises is to include a long microphone boom as part the headset. The long microphone boom can be physically connected to the headphone and can extend to a point near the mouth of the headset's user. A microphone, such as a directional microphone, can be housed near the tip of the microphone boom, to detect sound mainly from the user. As the directional microphone is positioned near the vicinity to the user, the environment noises present in the audio signals detected by the microphone can be effectively reduced, and the headset user's speech can be detected and transmitted to the connected device with a high fidelity.

While a long boom microphone can be effective in reducing noise, the use of it may not be preferred for various reasons. Specifically, as the long boom microphone is close to the user's mouth, it may interfere with other activities of the user, such as drinking, eating, etc. Moreover, the user's breathing may produce wind noise to the microphone. The long boom may also affect the aesthetic appearance of the user. To address the interference and aesthetic issues created by the long boom microphone, the boom that houses the microphone can be shortened. But with the shortened boom, the microphone becomes far away from the user's mouth and is also not directly facing the user's mouth. As a result, the microphone can pick up environment noise from different directions, and large environment noise components can be present in the audio signals detected by the microphone. While the environment noise components can be reduced by signal processing techniques, such as beam-forming and adaptive filtering, substantial noise components may still remain in the audio data, which can degrade the microphone speech quality of the headset.

Conceptual Overview of Certain Embodiments

Examples of the present disclosure relate to methods and systems for detection and transmission of audio signals from a peripheral device to a connected device that can address some of the challenges described above. In some examples, an apparatus can include a headset and an auxiliary device. In some examples, the headset can be in the form of earbuds. The headset can include a first wireless system, a first microphone, and a headphone. The first microphone can detect first egress audio signals, which can be from a user of the headset, and convert the first egress audio signals into first egress audio data using a first processing circuit (e.g., an analog-to-digital converter, a digital signal processor, etc.). The first wireless system can then transmit the first egress audio data, as the output (egress) of the headset. In addition, the first wireless system can also receive input (ingress) audio data originated at a mobile device. The ingress audio data are received as input audio data to the headset and be output by the one or more headphones. The first processing circuit (e.g., a digital-to-analog converter) can convert the ingress audio data into ingress audio signals, and the headphone can output the ingress audio signals to a user.

In addition, the auxiliary device includes a container, a second wireless system, a second processing circuit, and a second microphone. The container can be configured to hold the headset when the headset is not worn by the user. The container may further include a charging circuit to charge the headset. The second microphone can detect second egress audio signals and convert the audio signals using a second processing circuit into second egress audio data, and the second wireless system can transmit the second egress audio data as the output of the auxiliary device. In some examples, the second microphone can include, for example, a directional microphone to selectively detect egress audio signals from a particular direction, an array of microphones to support a beam-forming operation to selectively extract desired egress audio signals from a particular beam direction, etc. The second egress audio signals can be from the user of the headset, or from another speaker. In some examples, the auxiliary device can be configured as a charging case to store and charge the headset, with the second wireless system, the second processing circuit, and the second microphone embedded in the container case.

In some examples, the apparatus can form a two-way wireless connection with the mobile device. Through the two-way wireless connection, one of the headset or the auxiliary device can receive the ingress audio data from the mobile device via the two-way wireless connection. Moreover, in a first operation mode, either the headset or the auxiliary device can transmit the first egress audio data (detected and converted by the headset) to the mobile device via the two-wireless connection. Further, in a second operation mode, either the auxiliary device or the headset can transmit the second egress audio data (detected and converted by the auxiliary device) to the mobile device via the two-way wireless connection. In some examples, the two-way wireless connection can be based on a peer-to-peer network, such as a Bluetooth network, a WiFi Direct network, or other proprietary protocols.

Specifically, in some examples, the headset can form a two-way wireless connection (headset-mobile device wireless connection) with the mobile device, and a one-way (or two-way) wireless connection (headset-auxiliary device wireless connection) with the auxiliary device, such that the headset becomes an intermediary between the auxiliary device and the mobile device. The auxiliary device can transmit the second egress audio data to the headset via the headset-auxiliary device wireless connection. The headset can further include an operation mode selection circuit. In the first operation mode, the operation mode selection circuit can forward the first egress audio data (detected and converted by the headset) to the first wireless system of the headset, which can then transmit the first egress audio data to the mobile device via the headset-mobile device wireless connection wireless connection. In the second operation mode, the operation mode selection circuit can forward the second egress audio data (received from the auxiliary device via the headset-auxiliary device wireless connection) to the first wireless system, which can then transmit the second egress audio data to the mobile device via the headset-mobile device wireless connection. In some examples, the first processing circuit can perform a noise reduction computation based on finding a difference between the first egress audio signals and the second egress audio signals to generate the second egress audio data.

The operation mode selection circuit of the headset can determine whether to operate in the first operation mode or in the second operation mode in various ways. For example, the operation mode selection circuit can enter the second operation mode based on the first wireless system receiving the wireless signals including the second egress audio data, or wireless signals including other egress audio data, from the auxiliary device. As another example, the headset may include an input interface, such as a mechanical button, a touch interface, etc., that can detect an action from the user. Based on detecting the action, the operation mode selection circuit can switch between the first operation mode or the second operation mode. As yet another example, the operation mode selection circuit can also extract, from the first egress audio signals or the second egress audio signals, a command to operate in the first operation mode or in the second operation mode, and switch between the first operation mode or the second operation mode based on the command.

In some examples, the auxiliary device can transmit the second egress audio data to the headset when operating in the second operation mode, and stop the transmission of the second egress audio data when operating in the first operation mode. Specifically, the auxiliary device may also include an operation mode selection circuit. The operation mode selection circuit of the auxiliary device can disable the second microphone and/or the transmission of the second egress audio data to the headset when the apparatus operates in the first operation mode (or when the auxiliary device is turned off), and enable both the second microphone and/or the transmission of the second egress audio data to the headset when the apparatus operates in the second operation mode.

The operation mode selection circuit of the auxiliary device can determine whether to operate in the first operation mode or in the second operation mode in various ways. For example, the auxiliary device may also include an input interface, such as a mechanical button, a touch interface, etc., that can detect an action from the user. Based on detecting the action, the operation mode selection circuit can switch between the first operation mode or the second operation mode, or switch between transmitting or not transmitting the second egress audio data. With such a configuration, the auxiliary device can operate like a walkie-talkie in which a user can hold the auxiliary device and control when to enable or disable the second microphones and the wireless transmission of the second egress audio signals. For example, the user can enable the second microphones and the wireless transmission of the second egress audio signals when the intended speaker speaks, and disable the second microphones and/or the wireless transmission of the second egress audio signals when the intended speaker is not speaking, so as to transmit audio signals including mostly the user's speech to the mobile device.

The auxiliary device can also switch between the first operation mode and the second operation mode based on other techniques. For example, the auxiliary device may include an orientation sensor, such as a gyroscope, a gravity sensor, an inertial measurement unit, etc., that can detect the orientation of the auxiliary device as well as the second microphone. If the orientation sensor detects that the second microphone is not facing the ground, operation mode selection circuit of the auxiliary device can operate in the second operation mode to detect and wirelessly transmit the second egress audio signals. As another example, the operation mode selection circuit of the auxiliary device can also extract, from the second egress audio signals, a command to operate in the first operation mode or in the second operation mode, and switch between the first operation mode or the second operation mode based on the command. In all these examples, the auxiliary device can be used as a recording pad to record the speech of someone else other than the headset's user. The user can place the auxiliary device in an orientation, or speak to it, to cause the auxiliary device to operate in the second operation mode, and then leave the auxiliary device facing the speaker to record the speaker's speech.

In some examples, the auxiliary device can also form a two-way wireless connection with the mobile device, and a two-way or a one-way wireless connection with the headset, such that the auxiliary device becomes an intermediary between the headset and the mobile device. The headset can transmit the first egress audio data to the auxiliary device via a two-way wireless connection, or just receive the ingress audio data from the auxiliary device via a one-way wireless connection. The auxiliary device can transmit either the first egress audio data or the second egress audio data, based on whether the auxiliary device operates in the first operation mode or in the second operation mode, to the mobile device via a two-way wireless connection.

In addition, the auxiliary device and the headset may include an operation mode selection circuit to determine the operation mode based on the techniques described above. When operating in the second operation mode where the second egress audio data from the second microphones of the auxiliary device are transmitted to the mobile device, the headset can be disabled.

In some examples, both the headset and the auxiliary device are capable of establishing a wireless connection with the mobile device, and each is configurable to function as an intermediary/relay under different operation conditions/applications. For example, in a case the user wears the headset and listens to the headphone of the headset, the headset can be configured to function as an intermediary to receive ingress audio data from the mobile device and output the ingress audio signals via the headphone to the user. The headset can also receive second egress audio data from the auxiliary device, and transmit one of the first egress audio data or the second egress audio data to mobile device. Moreover, in a case where the user does not wear the headset and does not listen to the headphone, the auxiliary device can establish a one-way or two-way wireless connection with the mobile device, and transmit the second egress audio data to the mobile device. In some examples, each of the headset and the auxiliary device can be manually configured (e.g., by the user of the headset) to function as an intermediary. In some examples, the auxiliary device and the headset can also detect the operating condition such as, for example, whether the auxiliary device is disabled, whether the headset is disabled, whether the headset is placed inside the auxiliary device, etc., and select one of the auxiliary device or the headset as the intermediate based on the operating condition.

With the disclosed techniques, a headset and an auxiliary device can operate together to provide improved microphone speech quality across a wide range of operation conditions. For example, when operating in a noisy environment, the auxiliary device can be positioned and/or oriented to have its microphones facing the intended speaker, which allows the auxiliary device to detect speech audio signals of the intended speaker. On the other hand, when operating in a quiet environment, the auxiliary device can be disabled, and the headset can be enabled to detect speech audio signals of the intended speaker. In both cases, high quality audio signals can be detected and transmitted to the connected device (e.g., a phone, a computer, etc.). Such arrangements can provide high quality speech audio signals detection as a headset with a long boom microphone but without the interference and aesthetic issues created by the long boom microphone. In addition, the auxiliary device can support additional applications, such as being operated as a remote recording pad to record other speaker's speech, a push-to-talk walkie-talkie, etc., all of which are typically not supported by conventional headsets. Further, the auxiliary device can be configured as a charging case with embedded microphones and wireless system. By embedding the microphones and wireless system in the charging case that also holds and charges the headset, the overall system can be made more compact and convenient for the user. All these can improve user experience.

Example Techniques of Headset Noise Reduction

FIG. 1A, FIG. 1B, FIG. 1C, and FIG. 1D illustrate examples of operations of a wireless headset. Referring to FIG. 1A, a wireless headset 100 can include a headphone 102 and a microphone 104. Wireless headset 100 can also establish a two-way wireless connection 105, such as a Bluetooth connection, a WiFi Direction connection, etc., with a mobile device 106, which can operate a communication application 108 that takes part in a communication session. Microphone 104 can detect audio signals from user 110 of wireless headset 100, generate egress audio data 112, and transmit egress audio data 112 wirelessly to mobile device 106, which can then relay egress audio data 112 to other parties of the communication session. Moreover, communication application 108 can receive ingress audio data 114 from the communication session, and transmit ingress audio data 114 wirelessly to headset 100. Microphone 104 can then generate ingress audio signals from ingress audio data 114 and output the ingress audio signals to user 110. As such, user 110 can talk to and listen to other parties of the communication session via mobile device 106 while keeping his/her hands free.

One key performance index of a headset for communication applications is microphone speech quality, which can measure the quality of speech audio signals of the intended speaker (e.g., the user of the headset, or other speakers) detected by the microphone. In the example of FIG. 1A, the microphone speech quality of headset 100 can be determined by how well headset 100 reduces the environment noise components, with respect to the component of speech signals by user 110, in egress audio data 112. There are various sources of environment noises, such as fan noise, engine noise, speech from other speakers, traffic noises in the streets, etc. The environment noises can come from different directions and can have different intensities. The environment noises can be picked up by the microphone of the headset, together with the speech of the intended speaker, such that the audio signals detected by the microphone include both the environment noises and the speech of the intended speaker. The environment noises should be suppressed to allow parties of the communication applications to listen to the speaker's speech with a high fidelity.

Figure 1B:
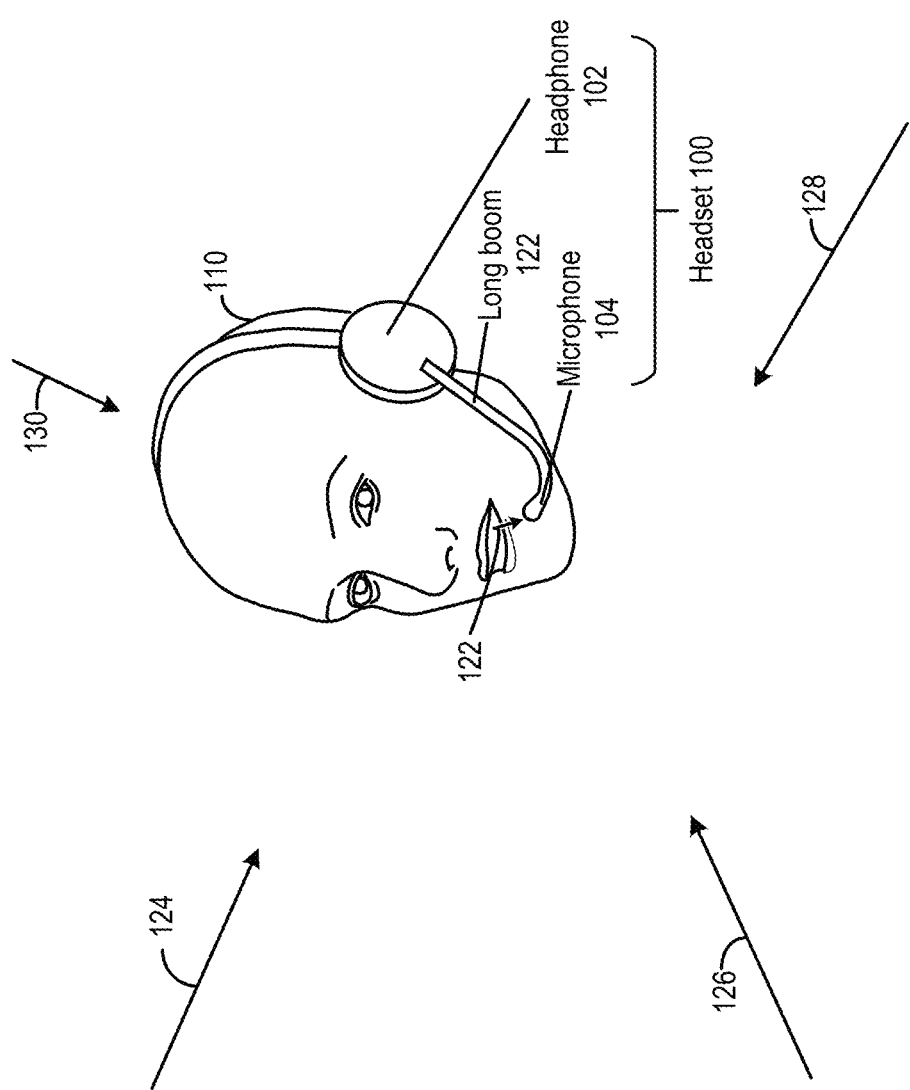

One way to reduce the environment noises is to include a long microphone boom as part the headset. FIG. 1B illustrates examples of headset 100 including a long boom 122. Long boom 122 can be physically connected to headphone 102 and can extend to a point near the mouth of user 110. Microphone 104 can be housed near the tip of boom 120. In some examples, microphone 104 can be configured as a directional microphone to detect sound mainly from the direction of user 110, which is represented by direction 123 in FIG. 1B. As a result, noise components from other directions, such as noises 124, 126, and 128, can be effectively reduced in the audio data generated by microphone 104. Noise 130 may travel along the same direction 123 but can be blocked by the head of user 110 from microphone 104, and therefore is also substantially reduced in the audio data generated by microphone 104. As a result, the speech of user 110 can be detected by microphone 104 and transmitted to mobile device 106 with a high fidelity, which can improve the microphone speech quality of headset 100. Although a long boom microphone, such as the one shown in FIG. 1B, can be effective in reducing noise, the use of it may be not preferred for various reasons. Specifically, as the long boom microphone is close to the user's mouth, it may interfere with other activities of user 110, such as drinking, eating, breathing, etc. The long boom may also affect the aesthetic appearance of user 110.

Figure 1C:
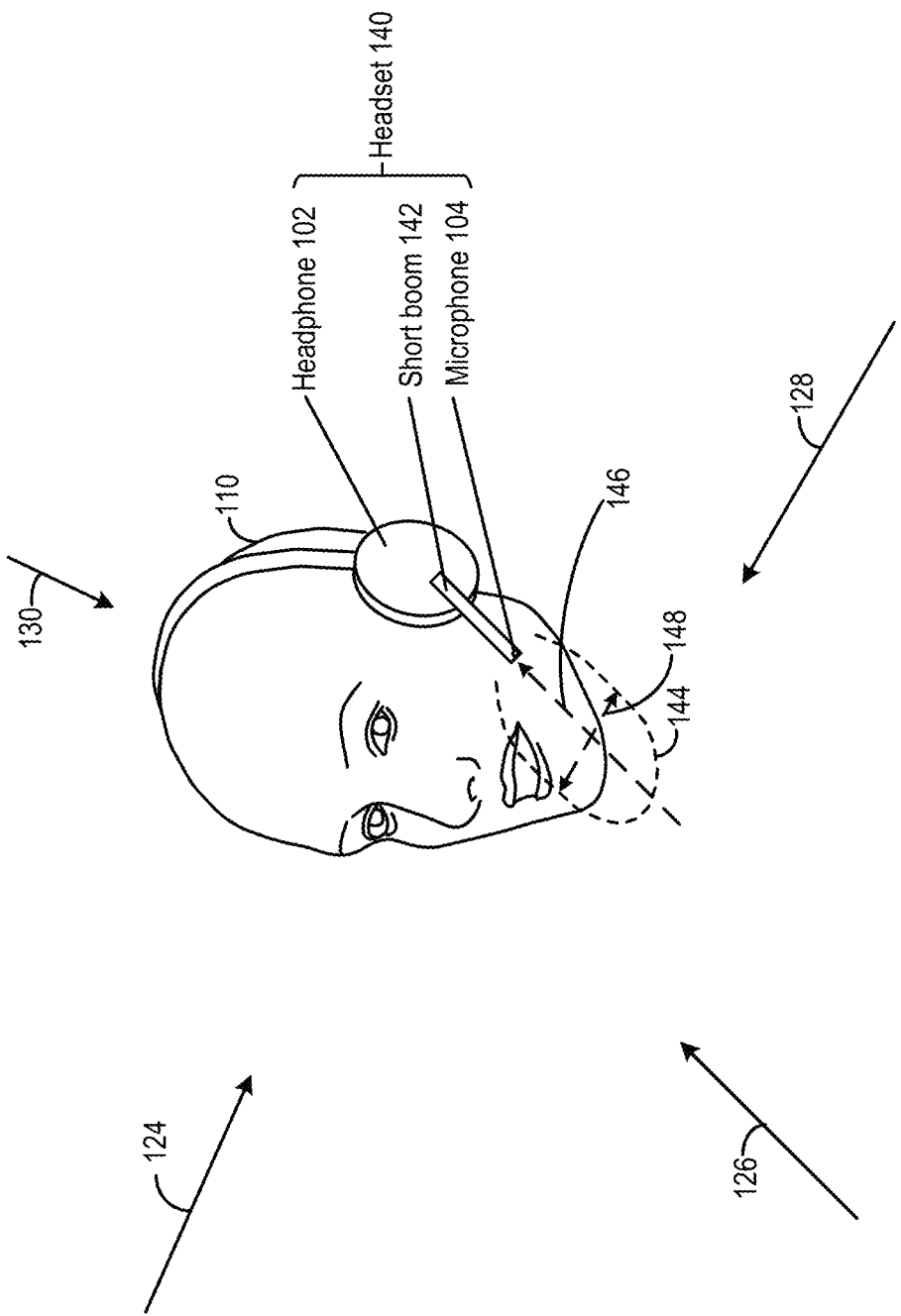
Figure 1D:
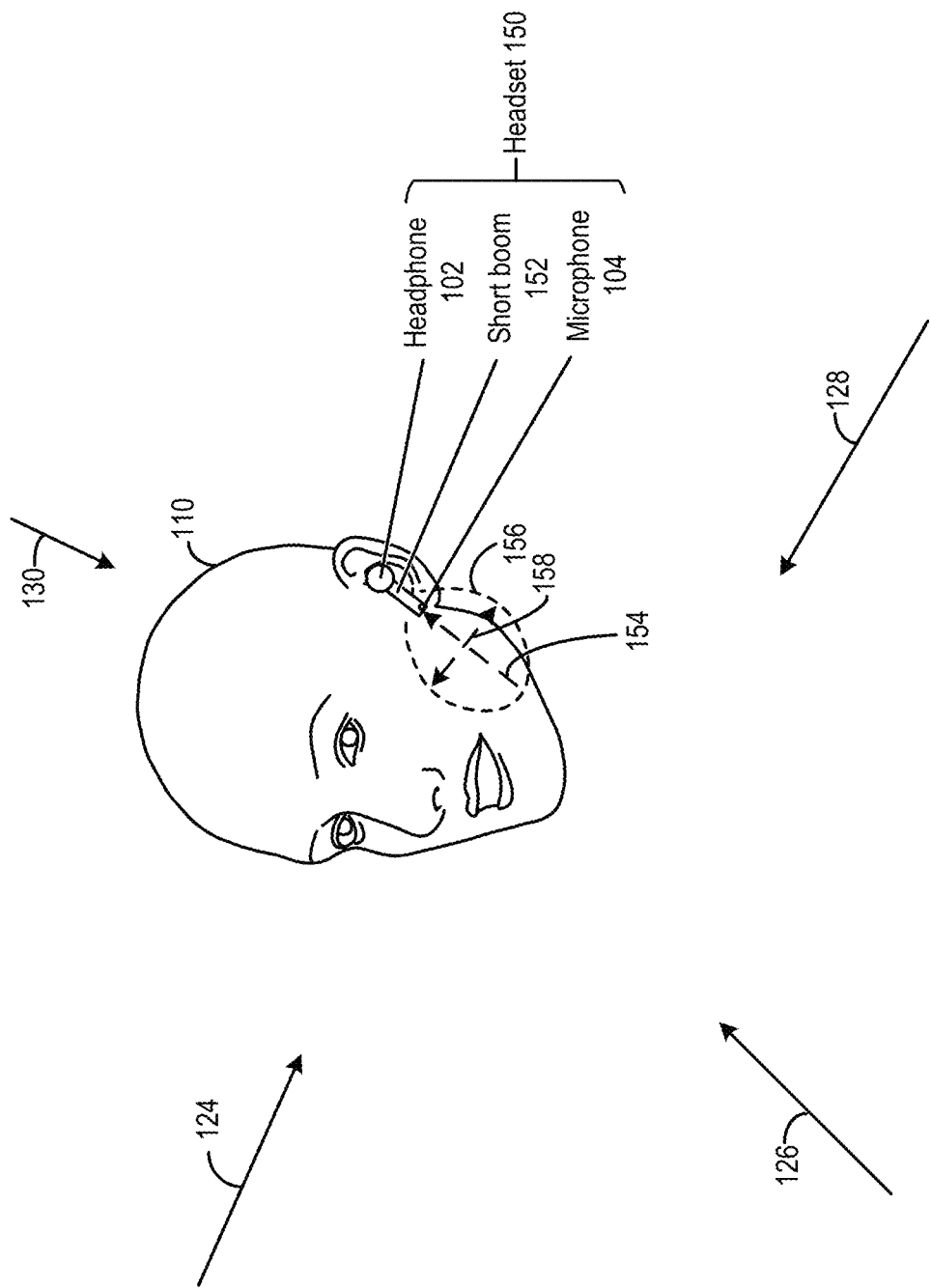

To address the interference and aesthetic issues created by the long boom microphone, the boom that houses the microphone can be shortened. FIG. 1C and FIG. 1D illustrate examples of headsets having a shortened boom. In FIG. 1C, headset 140 can include a short boom 142 that extends to about halfway between the mouth of user 110 and headphone 102, whereas in FIG. 1D, headset 150 can be configured as earbuds (e.g., true wireless stereo earphones) with a short boom 152 that extends slightly out of the ear of user 110, with each of short booms 142 and 152 housing microphone 104 at a tip. While the shortened booms can create less interference and aesthetic issues, microphone 104 becomes far away from the user's mouth and is also not directly facing the user's mouth. As a result, microphone 104 can pick up environment noise from different directions, such as noises 124, 126, and 128, and large environment noise components can be present in the audio signals detected by microphone 104, which can degrade the microphone speech quality of the headset.

Various signal processing techniques, such as beamforming and adaptive filtering, can be applied to the audio signals detected by microphone 104 to reduce the environment noise components in the audio data generated and transmitted to mobile device 106. Specifically, beamforming generally refers to using a sensor array, such as an array of microphones, for directional signal reception. A spatial filter can operate on the outputs of microphone array to extract desired audio signals from a particular beam direction, and within a particular beam width, while rejecting audio signals from other directions and outside the beam width. The particular beam direction can be selected to, for example, maximize the detection of the voice of user 110. In FIG. 1C, a beam 144 can be defined by a beam direction 146 and a beam width 148, whereas in FIG. 1D, a beam 154 can be defined by a beam direction 156 and a beam width 158.

The effectiveness of beamforming in reducing environment noise components can be limited by various factors. Specifically, while the spatial filter can be configured to extract desired audio signals from a particular beam direction, noise traveling from that direction can also be extracted and added to the audio data by the spatial filter. For example, in FIG. 1C and FIG. 1D, noise 126, which can be the form of KB punching noises from a far-end side user talking to user 110, can be extracted by the spatial filter as the noises also travel along the beam direction. In addition, due to the limited space available at the short boom, the number of microphone elements in the array is also limited, which can limit the beam selectivity and lead to a wide beam width. For example, beam width 158 of microphone 104 of headset 150 can be wider than beam width 148 of microphone 104 of headset 140 due to a smaller number of microphone elements in headset 150, which reduces the beam selectivity and allows more noise to be present at the output of the spatial filter, which can degrade the microphone speech quality of the headsets.

In addition, adaptive filtering, such as filtering based on artificial intelligence (AI), can be used to filter out environment noises. But such filtering is typically adapted to filter out non-speech noise components, such as fan noise, wind noise, traffic noise, etc. On the other hand, adaptive filtering may be unable to distinguish speeches between intended speakers and unintended speakers. As a result, speeches from unintended speakers may still be present in the adaptive filter output, which can also degrade the microphone speech quality of the headsets.

Examples of a Headset with Wireless Auxiliary Device

Figure 2A:
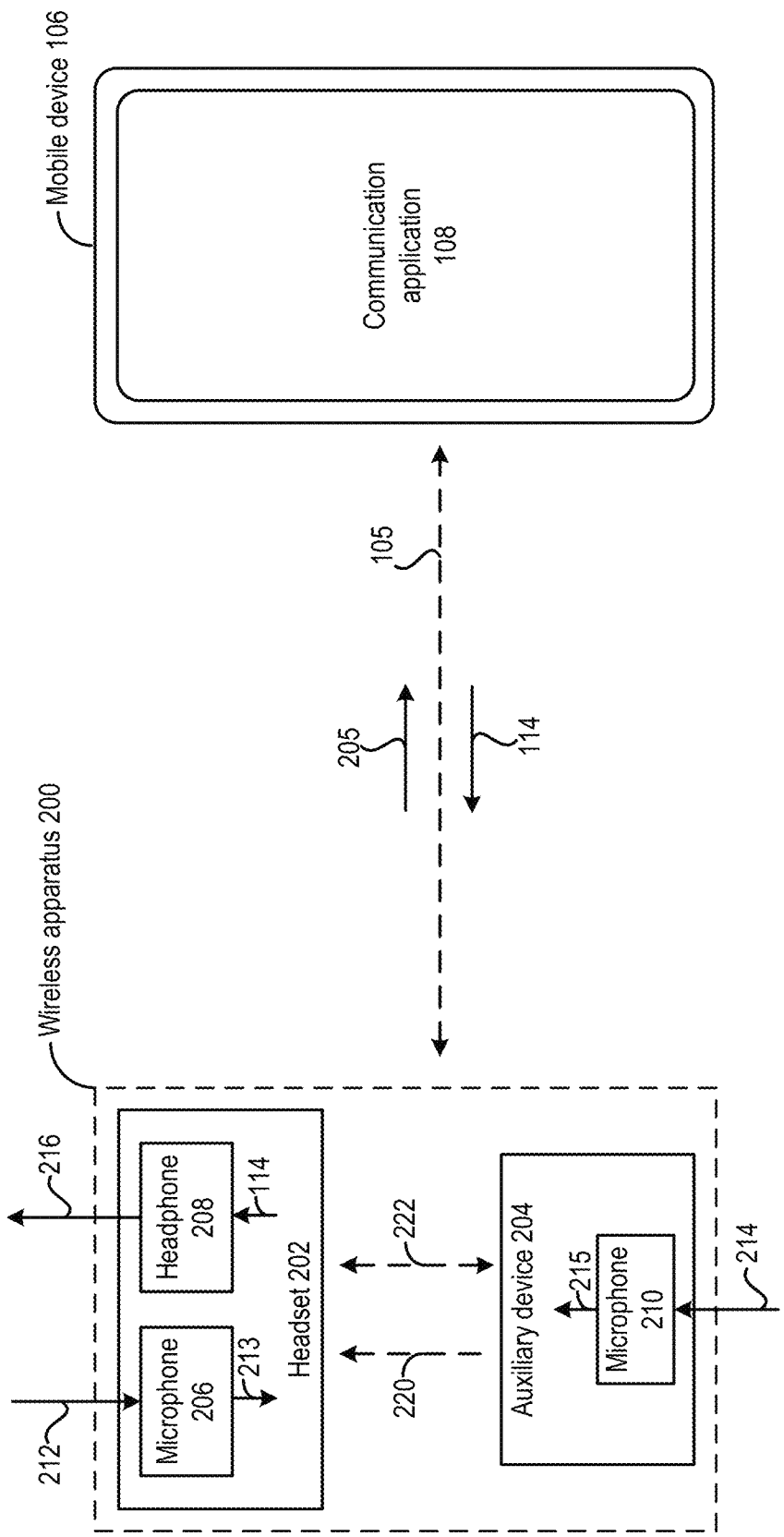
FIG. 2A, FIG. 2B, and FIG. 2C illustrate examples of a headset with a wireless auxiliary device, according to some embodiments.
Figure 2B:
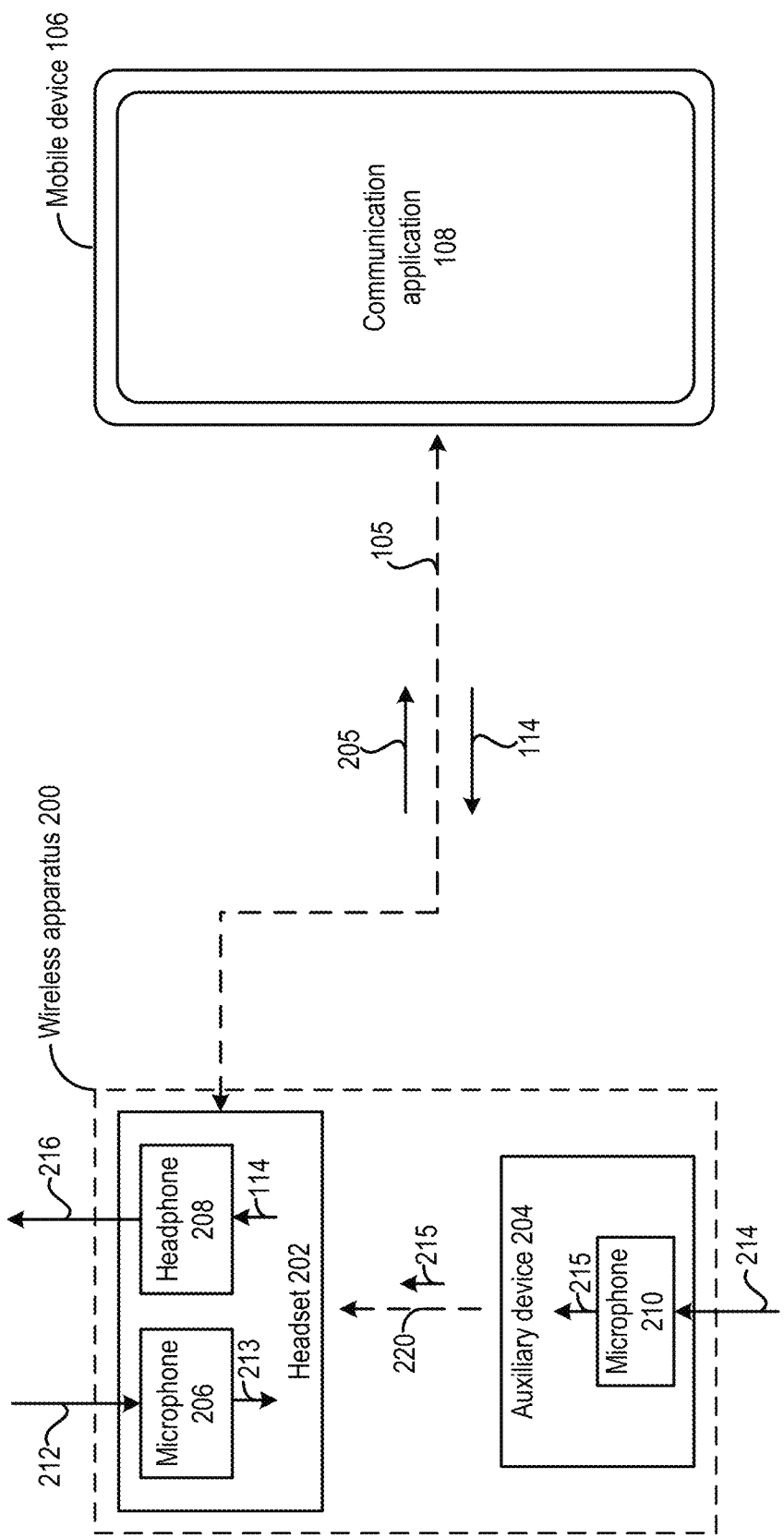
Figure 2C:
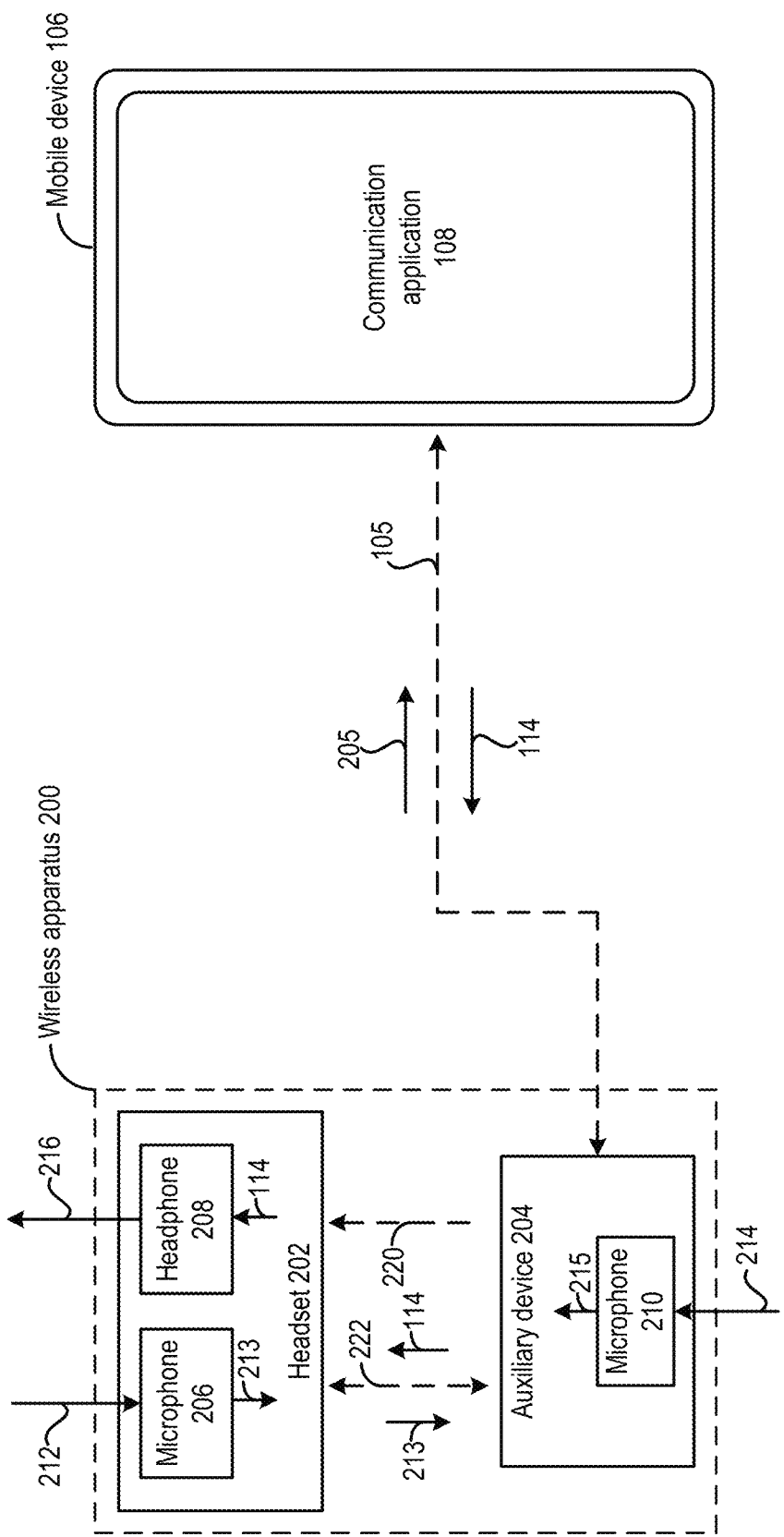

FIG. 2A-FIG. 2C illustrate examples of a wireless apparatus 200 that can address at least some of the issues above. As shown in FIG. 2A, wireless apparatus 200 can include a headset 202, which can be in the form of earbuds or in other forms, and a wireless auxiliary device 204. Wireless apparatus 200 can establish two-way wireless connection 105 with mobile device 106. Via two-way wireless connection 105, wireless apparatus 200 can transmit egress audio data 205 and receive ingress audio data 114.

Headset 202 can include a microphone 206 and a headphone 208, whereas wireless auxiliary device 204 can include a second microphone 210. In some examples, as to be described below, wireless auxiliary device 204 can be configured as a charging case for headset 202. Each of microphone 206 and second microphone 210 can include a single microphone or an array of microphones, as well as processing circuits, such as an analog-to-digital converter (ADC), a digital signal processor (DSP), etc. Microphone 206 can detect first egress audio signals 212 and generate first egress audio data 213, whereas second microphone 210 can detect second egress audio signals 214 and generate second egress audio data 215. Headphone 208 can receive ingress audio data 114 via two-way wireless connection 105, and convert ingress audio data 114 to ingress audio signals 216. Headphone 208 may include a processing circuit, such as a digital-to-analog converter (DAC), to perform the conversion. In addition, headset 202 and auxiliary device 204 can also establish a wireless connection, which can be a one-way connection 220 or a two-way connection 222, to transmit first egress audio data 213, second egress audio data 215, as well as ingress audio data 114.

Wireless apparatus 200 can selectively transmit one of first egress audio data 213 or second egress audio data 215 as egress audio data 205 to mobile device 106 via two-way wireless connection 105. Specifically, in a first operation mode, wireless apparatus 200 can transmit first egress audio data 213 as egress audio data 205, whereas in a second operation mode, wireless apparatus 200 can transmit second egress audio data 215 as egress audio data 205. The operation mode can be determined based on the operating condition of wireless apparatus 200. For example, as to be described below, auxiliary device 204 can be positioned to detect audio signals of an intended speaker (e.g., a user who wears headset 202, or other speakers) with a higher fidelity than headset 202. In such examples, when auxiliary device 204 is enabled to transmit egress audio data, wireless apparatus 200 can switch to the second operation mode. On the other hand, when auxiliary device 204 (or at least microphone 210) is disabled and no longer transmits egress audio data, wireless apparatus 200 can switch to the first operation mode.

FIG. 2B and FIG. 2C illustrate additional examples of operations of wireless apparatus 200. Referring to FIG. 2B, in some examples, headset 202 can establish two-way wireless connection 105 with mobile device 106, and one-way wireless connection 220 with auxiliary device 204. In such examples, headset 202 can function as an intermediary/relay between auxiliary device 204 and mobile device 106. Auxiliary device 204 can transmit second egress audio data 215 to headset 202 via one-way wireless connection 220. Headset 202 can then transmit, based on the operation mode, one of first egress audio data 213 or second egress audio data 215 as egress audio data 205 to mobile device 106 via two-way wireless connection 105.

In addition, referring to FIG. 2C, in some examples, auxiliary device 204 can establish two-way wireless connection 105 with mobile device 106, as well as two-way wireless connection 222 with headset 202. In such examples, auxiliary device 204 can function as an intermediary/relay between headset 202 and mobile device 106. Auxiliary device 204 can receive ingress audio data 114 via two-way wireless connection 105, and forward ingress audio data 114 to headset 202 via two-way wireless connection 222 or one-way wireless connection 220. In addition, auxiliary device 204 can also receive first egress audio data 213 via two-way wireless connection 222 from headset 202. Auxiliary device 204 can then transmit, based on the operation mode, one of first egress audio data 213 or second egress audio data 215 as egress audio data 205 to mobile device 106 via two-way wireless connection 105. In a case where headset 202 is disabled, auxiliary device 204 can also establish a one-way wireless connection (not shown in FIG. 2C) with mobile device 106 to transmit second egress audio data 215.

Figure 3A:
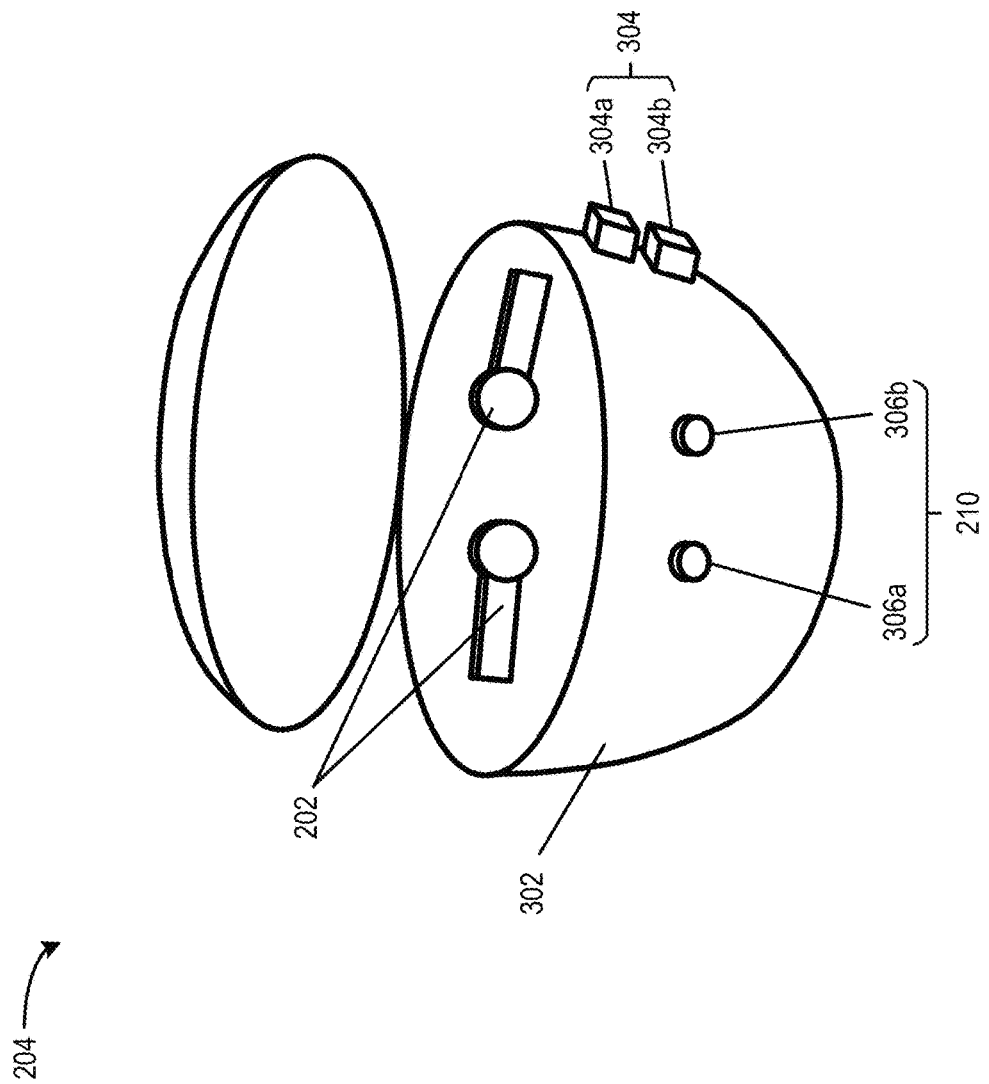
FIG. 3A, FIG. 3B, FIG. 3C, FIG. 3D, and FIG. 3E illustrate examples applications of the examples of headset and auxiliary device of FIG. 2A-FIG. 2C, according to some embodiments.

FIG. 3A, FIG. 3B, FIG. 3C, FIG. 3D, and FIG. 3E illustrate examples of wireless apparatus 200 and their applications. As shown in FIG. 3A, auxiliary device 204 can include a container case 302 to hold headset 202, which can be in the form of earbuds, with a wireless system and other circuitries embedded within container case 302. In some examples, auxiliary device 204 can also include a charging circuit embedded within container case 302 to charge headset 202 when headset 202 is put in container case 302, such that auxiliary device 204 is configured as a charging case for headset 202. As miniature headsets are typically carried and charged in a charging case, having auxiliary device 204 configured as a charging case can provide a compact and convenient noise reduction solution to the user.

In addition, auxiliary device 204 also includes microphone 210 as well as input interface elements 304 formed on the outer surface of container case 302. In FIG. 3A, microphone 210 can include a plurality of microphone elements 306a and 306b to support a beam-forming operation. Moreover, input interface elements 304 can include an input interface element 304a to turn on/off microphone 210, and an input interface element 304b to support a push-to-talk function. Input interface elements 304 can include mechanical buttons, touch interfaces, etc., to detect an action (e.g., a pressing action, a touch gesture, etc.) of the user.

Figure 3B:
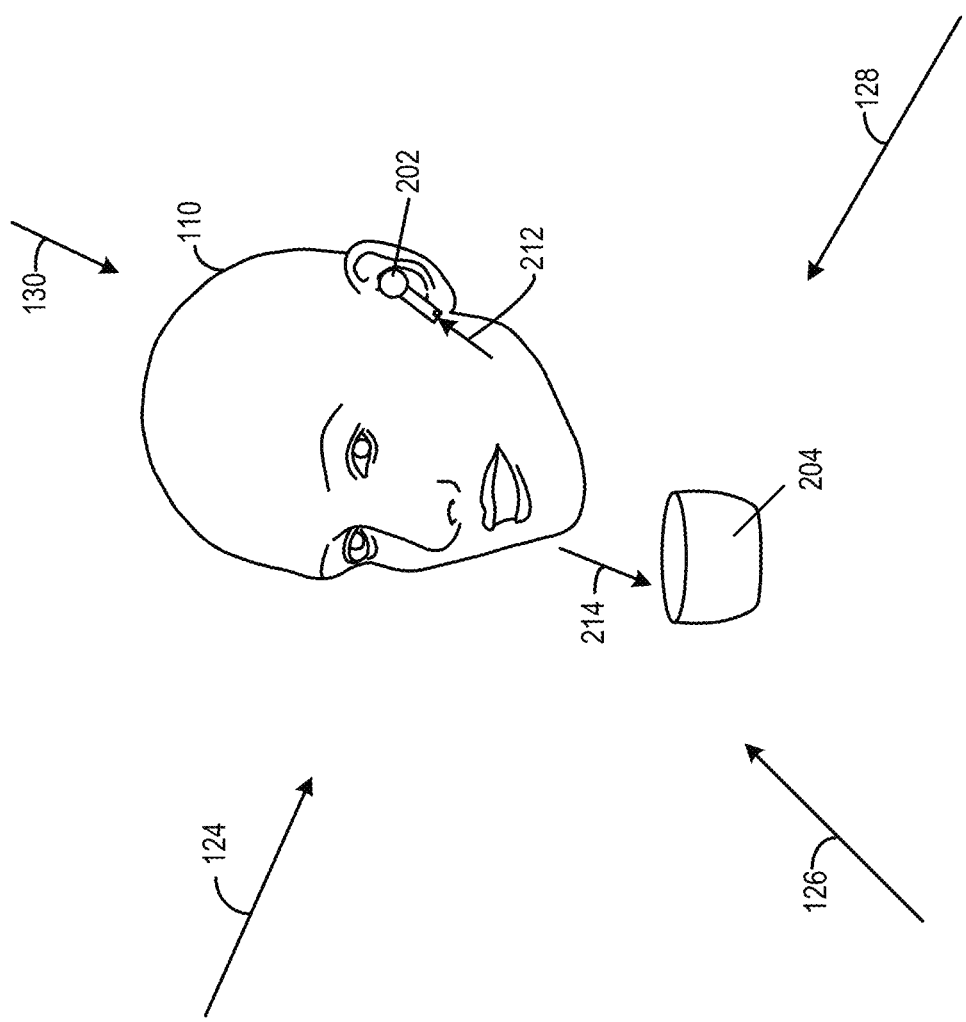

FIG. 3B illustrates an example application of wireless apparatus 200. As shown in FIG. 3B, user 110 can wear headset 202 and position auxiliary device 204 such that microphone 210 (not shown in FIG. 3B) faces user 110. In a noisy environment, user 110 can turn on microphone 210 by performing a first action (e.g., pressing down a button, a first touch gesture, etc.) on input interface elements 304a, which causes wireless apparatus 200 to enter the second operation mode. In the second operation mode, microphone 210 can be enabled to detect second egress audio signals 214 and generate second egress audio data 215. With a beam-forming operation, auxiliary device 204 can operate a spatial filter to extract the audio signals from a beam direction aligned with the mouth of user 110. Moreover, microphone 206 of headset 202 can be enabled in the second operation mode to detect first egress audio signals 212 and generate first egress audio data 213, which can include environment noise and can be used in noise reduction operation to further the environment noise components in second egress audio data 215. These arrangements allow high fidelity detection of audio signals from user 110 by auxiliary device 204 in similar fashion as a long boom microphone, such as the example shown in FIG. 1B, with noises 124, 126, and 128 effectively reduced in the audio data generated by microphone 210, while noise 130 can be blocked by the head of user 110 from microphone 210. Meanwhile, as there is no long boom extended from headset 202, the interference and aesthetic issues brought by the long boom microphone can also be avoided.

On the other hand, in a quiet environment, user 110 can turn off microphone 210 by performing another action (e.g., releasing a button, a second touch gesture, etc.) on input interface elements 304a. Wireless apparatus 200 can also switch back to the first operation mode, in which microphone 206 of headset 202 can detect first egress audio signals 212 and generate first egress audio data 213, and wireless apparatus 200 can transmit first egress audio data 213 to mobile device 106.

Figure 3C:
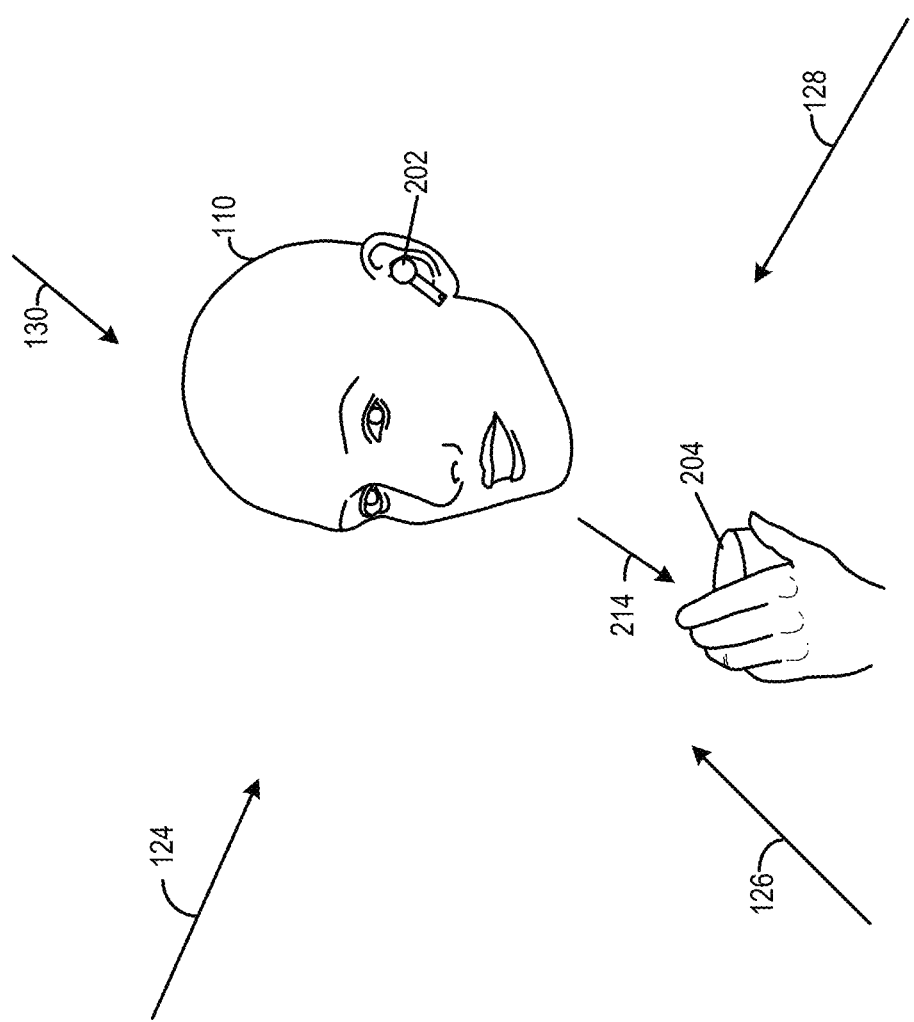
Figure 3D:
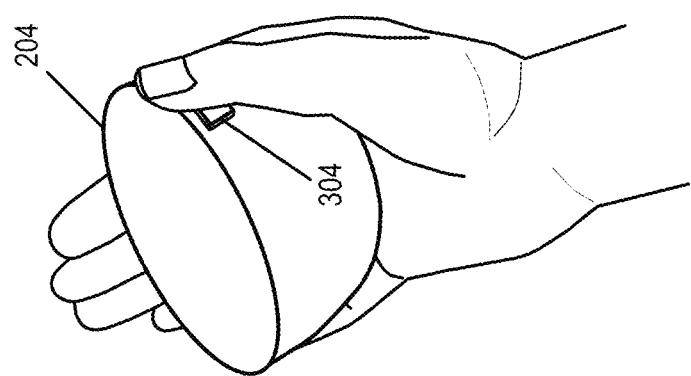

FIG. 3C and FIG. 3D illustrate another example application of wireless apparatus 200. As shown in FIG. 3C, user 110 can hold auxiliary device 204 while talking, whereas FIG. 3D shows that user 110 can perform an action (e.g., pressing or releasing a button) on input interface element 304b while holding auxiliary device 204. In FIG. 3C and FIG. 3D, user 110 can operate auxiliary device 204 like a walkie-talkie, in which microphone 210 is enabled and auxiliary device 204 transmits second egress audio data 215 to mobile device 106 only when user 110 presses on input interface element 304b. The walkie-talkie operation can support a communication application in an extremely noisy environment, in which user 110 can enable microphone 210 of auxiliary device 204 to detect and transmit the speech signals of user 110 only when user 110 is speaking, and mute microphone 210 when user 110 is not speaking. Such arrangements can reduce the transmission of environmental noise to other parties of the communication application.

Figure 3E:
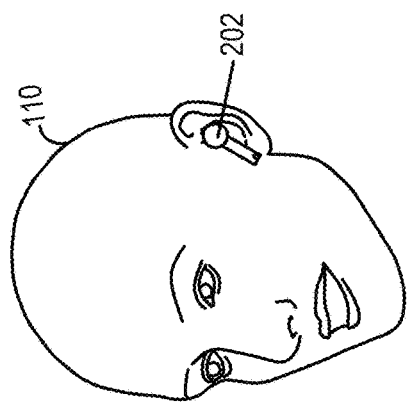
Figure 3E:
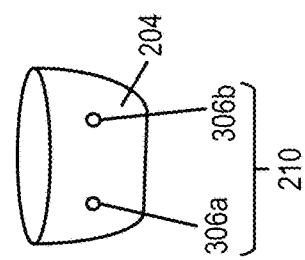
Figure 3E:
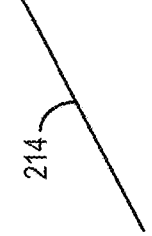
Figure 3E:
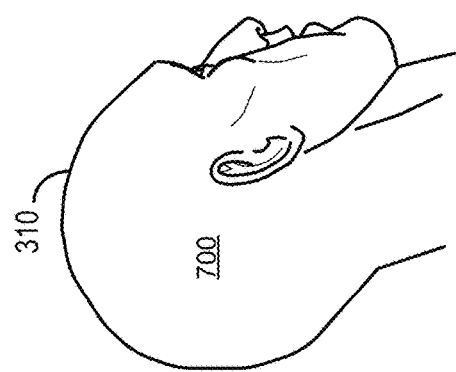

FIG. 3E illustrates another example application of wireless apparatus 200. In FIG. 3E, auxiliary device 204 can be operated as a remote recording pad facing another speaker 310 other than user 110. In this application, microphone 210 of auxiliary device 204 can be enabled to detect second egress audio signals 214 from speaker 310, generate second egress audio data 215, and transmit second egress audio data 215 to mobile device 106. In some examples, mobile device 106 may operate another application that distributes second egress audio data 215 to multiple parties. In some examples, when wireless apparatus 200 operates as a recording pad, headset 202 can be disabled and/or put inside the container case of auxiliary device 204. In some examples, microphone 206 of headset 202 can also be enabled to detect environment noises. Headset 202 can transmit first egress audio data 213 including the environment noise components to auxiliary device 204, which can post-process second egress audio data 215 using first egress audio data 213 for noise reduction, and transmit post-processed second egress audio data 215 to mobile device 106.

In the applications illustrated in FIG. 3B-FIG. 3E, both headset 202 and auxiliary device 204 are capable of establishing a wireless connection with mobile device 106, and each is configured to function as an intermediary/relay under different operating conditions. For example, referring to FIG. 3B and FIG. 3C where user 110 wears headset 202 and listens to headphone 208 of headset 202, headset 202 can be configured to function as an intermediary. Such arrangements can reduce the transmission latency associated with ingress audio data 114 and the perception of delay by user 110. Referring back to FIG. 2B, headset 202 can receive ingress audio data 114 from mobile device 106 and output ingress audio signals 216 via headphone 208 to user 110. Headset 202 can also receive second egress audio data 215 from auxiliary device 204, and transmit one of first egress audio data 213 or second egress audio data 215 to mobile device 106 via two-way wireless connection 105. Headset 202 can also post-process second egress audio data 215 using first egress audio data 213 for noise reduction prior to transmitting second egress audio data 215. On the other hand, in a case where the user does not wear the headset and does not listen to the headphone, such as when auxiliary device 204 is configured as a recording pad as shown in FIG. 3C, auxiliary device 204 can establish a one-way or two-way wireless connection with mobile device 106, and transmit second egress audio data 215 directly to mobile device 106. In this case, having auxiliary device 204 to directly transmit second egress audio data 215 to mobile 106 can reduce the transmission latency associated with second egress audio data 215.

As to be described below, wireless apparatus 200 can switch between the first operation mode and between the second operation mode in various ways. For example, as described above, auxiliary device 204 can switch between the two modes of operation based on detecting a user's action on input interface elements 304. Auxiliary device 204 may also switch to the second operation mode based on detecting that headset 202 is plugged into the charging circuit and/or disposed in container case 302. In addition, auxiliary device 204 may include an orientation sensor, such as a gyroscope, a gravity sensor, an inertial measurement unit, etc., that can detect the orientation of auxiliary device 204 as well as microphone 210. If the orientation sensor detects that microphone 210 is not facing the ground, the auxiliary device can switch to the second operation mode. As another example, auxiliary device 204 can also extract, from second egress audio signals 214, a command to operate in the first operation mode or in the second operation mode, and switch between the first operation mode or the second operation mode based on the command. In addition, headset 202 can also switch to the second operation mode based on, for example, receiving wireless data including second egress audio data 215 from auxiliary device 204, detecting a user action on an input interface, being plugged into the charging circuit of auxiliary device 204, extracting a command to operate in the second operation mode from first egress audio signals 212, etc.

In addition, wireless apparatus 200 can also switch between using headset 202 and auxiliary device 204 to establish a wireless connection with mobile device 106, based on various mechanisms. For example, in a case where the wireless connection is based on Bluetooth, one of headset 202 and auxiliary device 204 can be manually paired with mobile device 106. Upon detecting that a wireless connection is established between one of the devices with mobile device 106, or at least a pairing signal is received, the device connected with mobile device 106 can then designate itself as the intermediary and perform the relaying of first egress audio data 213, second egress audio data 215, ingress audio data 114, etc. As another example, each of headset 202 and auxiliary device 204 can detect an operating condition, and configure itself as the intermediary/relay based on the detected operation condition. For example, if headset 202 detects that auxiliary device 204 is disabled (e.g., based on not receiving second egress audio data 215), headset 202 can designate itself as the intermediary, and vice versa. As another example, if auxiliary device 204 detects that headset 202 is placed inside container case 302 and/or is being charged by the charging circuit (e.g., when operating as a recording pad), auxiliary device 204 may designate itself as the intermediary.

Figure 4A:
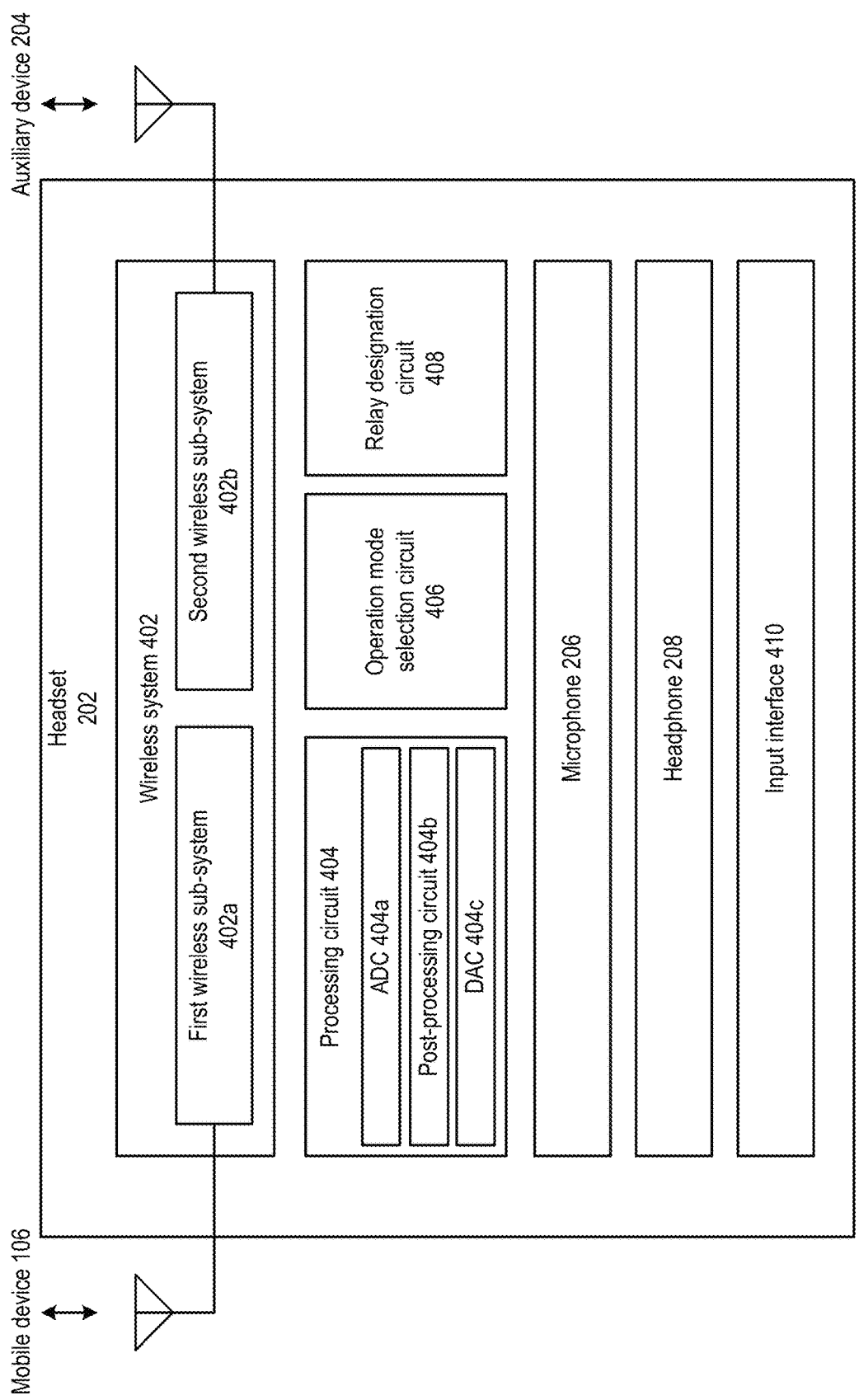
FIG. 4A and FIG. 4B illustrate examples of internal components of headset and auxiliary device of FIG. 2A-FIG. 2C, according to some embodiments.
Figure 4B:
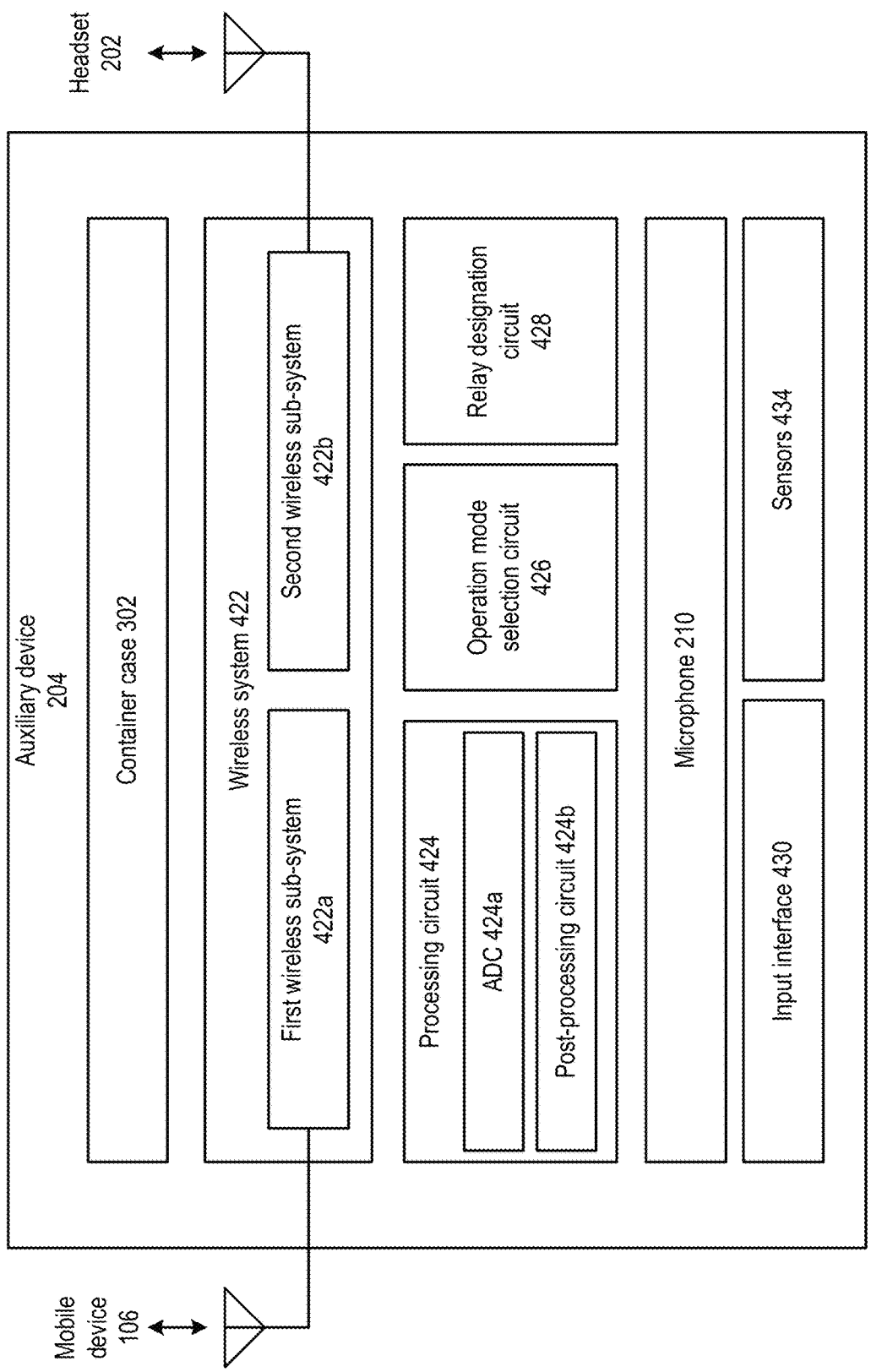

FIG. 4A and FIG. 4B illustrate examples of internal components of headset 202 and auxiliary device 204. As shown in FIG. 4A, headset 202 may include a wireless system 402, a processing circuit 404, an operation mode selection circuit 406, a relay designation circuit 408, microphone 206, headphone 208, and an input interface 410. Processing circuit 404, operation mode selection circuit 406, and relay designation circuit 408 can be implemented as part of the same integrated circuit chip or in multiple integrated circuit chips. Some of these circuits can be implemented using a controller that executes instructions. Input interface 410 can include, for example, one or more mechanical buttons, a touch interface, etc.

In addition, wireless system 402 can include one or more wireless sub-systems, with each sub-system having an antenna and a transceiver. In some examples, wireless system 402 can include a first wireless sub-system 402a to establish two-way wireless connection 105 with mobile device 106, and a second wireless sub-system 402b to establish one-way wireless connection 220 or two-way wireless connection 222 with auxiliary device 204. Sub-system 402a and 402b can generate, transmit, and receive wireless data based on various wireless protocols, such as Bluetooth, WiFi Direct, etc.

Processing circuit 404 can include an analog-to-digital converter (ADC) 404a, a post-processing circuit 404b, and a digital-to-analog converter (DAC) 404c. The ADC can convert egress audio signals (e.g., first egress audio signals 212) received by microphone 206 into digital egress audio data (e.g., first egress audio data 213), which can then be transmitted by wireless system 402. Moreover, DAC 404c can convert ingress audio data (e.g., ingress audio data 114), which can be converted by DAC 404c into ingress audio signals (e.g., ingress audio signals 216) and output by headphone 208.

Further, post-processing circuit 404b can include a digital signal processor (DSP) to perform various post-processing operations to generate the digital egress audio data, such as performing spatial filtering for a beam-forming operation, performing noise cancellation, etc. In some examples, when operating in the second operation mode, post-processing circuit 404b can perform a noise cancellation/reduction operation based on finding differences between first egress audio signals 212 detected by headset 202 and second egress audio signals 214 detected by auxiliary device 204, to generate second egress audio data 215. For example, when one of first egress audio signals 212 or second egress audio signals 214 contain speech signals of the intended speaker, the other egress audio signals can contain environment noise (e.g., fan noise, traffic noise, speech signals of unintended speaker, etc.). By finding differences in first egress audio signals 212 and second egress audio signals 214, and generating second egress audio data 215 based on the differences, the environment noise components present in second egress audio data 215 can be suppressed or removed.

In addition, operation mode selection circuit 406 can determine an operation mode, and forward one of first egress audio data 213 (from microphone 206 and processing circuit 404) or second egress audio data 215 to wireless system 402. As described above, operation mode selection circuit 406 of headset 202 can determine the operation mode based on various ways. For example, operation mode selection circuit 406 can select the first operation mode by default, and switch to the second operation mode when second wireless sub-system 402b receives second egress audio data 215 from auxiliary device 204. In addition, operation mode selection circuit 406 can also switch to the second operation mode based on detecting a user action input interface 410, being plugged into the charging circuit of auxiliary device 204, extracting a command to operate in the second operation mode from first egress audio signals 212, etc.

Furthermore, relay designation circuit 408 can determine whether to designate headset 202 as the intermediary/relay device between auxiliary device 204 and mobile device 106. Upon determining that headset 202 is not to function as an intermediary/relay device, relay designation circuit 408 can disable first wireless sub-system 402a (or change its operation) as headset 202 is not to have a wireless connection with mobile device 106, while enabling second wireless sub-system 402b for transmission of first egress audio data 213 to auxiliary device 204. On the other hand, if relay designation circuit 408 determines that headset 202 is to function as an intermediary/relay device, relay designation circuit 408 can enable both first wireless sub-system 402a and second wireless sub-system 402b to maintain a wireless connection with, respectively, mobile device 106 and auxiliary device 204.

As described above, relay designation circuit 408 can determine whether to designate headset 202 as the intermediary/relay device based on various ways. For example, in a case where the wireless connection is based on Bluetooth, one of headset 202 and auxiliary device 204 can be manually paired with mobile device 106. If relay designation circuit 408 detects that a wireless connection is established between headset 202 and mobile device 106, or at least a pairing signal is received by first wireless sub-system 402a, relay designation circuit 408 can designate headset 202 as the intermediary/relay device. As another example, relay designation circuit 408 can detect an operating condition of headset 202 and perform the designation based on the operation condition. The operation condition may include, for example, auxiliary device 204 being disabled (e.g., based on not receiving second egress audio data 215), headset 202 being placed inside container case 302, being charged by the charging circuit, receiving an user input through input interface 410, etc.

FIG. 4B illustrates examples of internal components of auxiliary device 204. As shown in FIG. 4B, auxiliary device 204 may include container case 302, a wireless system 422, a processing circuit 424, an operation mode selection circuit 426, a relay designation circuit 428, microphone 210, an input interface 430, and sensors 434. Container case 302 can be configured to hold headset 202, and may further include a charging circuit to charge headset 202. Processing circuit 424, operation mode selection circuit 426, and relay designation circuit 428 can be implemented as part of a same integrated circuit chip or in multiple integrated circuit chips. Some of these circuits can be implemented using a controller that executes instructions. Input interface 430 can include input interface 304 of FIG. 3A and may include, for example, one or more mechanical buttons, a touch interface, etc. Sensors 434 may include, for example, an orientation sensor.

Wireless system 422 can include one or more wireless sub-systems, with each sub-system having an antenna and a transceiver. In some examples, wireless system 422 can include a first wireless sub-system 422a to establish two-way wireless connection 105 with mobile device 106, and a second wireless sub-system 422b to establish one-way wireless connection 220 or two-way wireless connection 222 with headset 202. Sub-system 422a and 422b can generate, transmit, and receive wireless data based on various wireless protocols, such as Bluetooth, WiFi Direct, or other protocols. In some examples, wireless system 422 may establish a wireless connection with headset 202 but not mobile device 106.

Processing circuit 424 can include an analog-to-digital converter (ADC) 424a and a post-processing circuit 424b. The ADC can convert egress audio signals (e.g., second egress audio signals 214) received by microphone 210 into digital egress audio data (e.g., second egress audio data 215), which can then be transmitted by wireless system 422. Moreover, post-processing circuit 424b can include a digital signal processor (DSP) to perform various post-processing operations to generate the digital egress audio data, such as performing spatial filtering for a beam-forming operation, performing noise cancellation, etc. In some examples, post-processing circuit 424b can perform a noise cancellation/reduction operation based on finding differences between first egress audio signals 212 received from headset 202 via wireless system 422, and second egress audio signals 214 detected by microphone 210, to generate second egress audio data 215, similar to post-processing circuit 404b of FIG. 4A.

In addition, operation mode selection circuit 426 can determine an operation mode, and forward one of first egress audio data 213 (received from wireless system 422) or second egress audio data 215 (received from microphone 210 and processing circuit 424) to wireless system 422. Operation mode selection circuit 426 of auxiliary device 204 can determine the operation mode based on various ways, such as based on detecting a user's action on input interface 430, detecting that headset 202 is plugged into the charging circuit and/or disposed in container case 302, detecting, based on sensors 434, that microphone 210 is not facing the ground, extracting, from second egress audio signals 214, a command to operate in the first operation mode or in the second operation mode, etc.

Furthermore, relay designation circuit 428 can determine whether to designate auxiliary device 204 as the intermediary/relay device between headset 202 and mobile device 106. Upon determining that auxiliary device 204 is not to function as an intermediary/relay device, relay designation circuit 428 can disable first wireless sub-system 422a (or change its operation) as auxiliary device 204 is not to have a wireless connection with mobile device 106, while enabling second wireless sub-system 422b for transmission of second egress audio data 215 to headset 202. On the other hand, if relay designation circuit 428 determines that auxiliary device 204 is to function as an intermediary/relay device, relay designation circuit 428 can enable both first wireless sub-system 422a and second wireless sub-system 422b to maintain wireless connection with, respectively, mobile device 106 and headset 202.

Relay designation circuit 428 can determine whether to designate auxiliary device 204 as the intermediary/relay device based on various ways, such as detecting a pairing signal or a wireless connection is established between auxiliary device 204 and mobile device 106. As another example, relay designation circuit 428 can detect an operating condition, such as headset 202 being disabled (e.g., based on not receiving first audio egress data 213), headset 202 being placed inside container case 302 and/or is being charged by the charging circuit, etc.

In some examples, headset 202 and auxiliary device 204 do not include, respectively, relay designation circuit 408, relay designation circuit 428, and wireless sub-system 422a, such that headset 202 is pre-configured as the intermediary/relay device between auxiliary device 204 and mobile device 106, and that mobile device 106 only forms a wireless connection with headset 202 but not with auxiliary device 204.

Figure 5B:
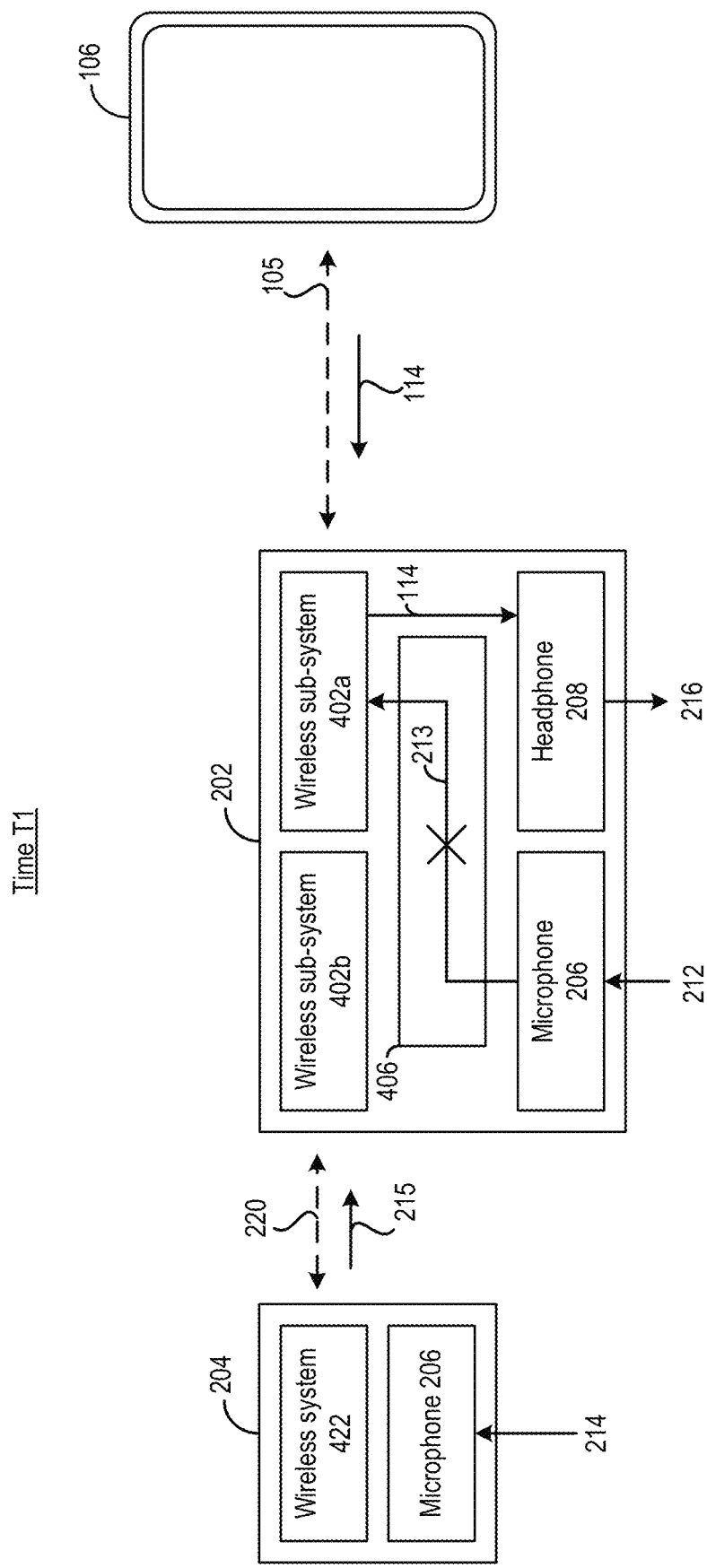
Figure 5C:
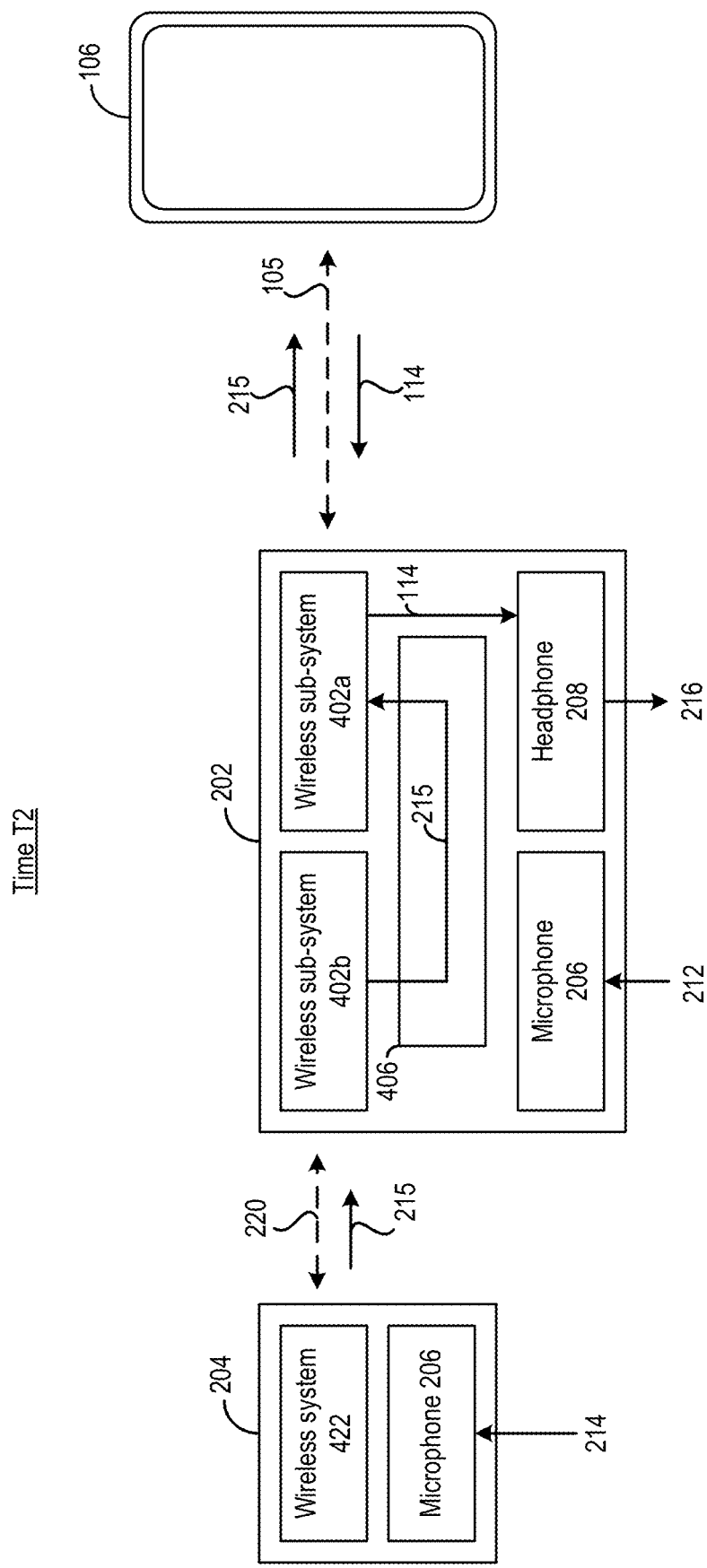

FIG. 5A, FIG. 5B, and FIG. 5C illustrate an example of sequence of mode switching operations of wireless apparatus 200 in which headset 202 functions as an intermediary/relay.

Referring to FIG. 5A, at time T0, headset 202 operates in the first operation mode and establishes two-way wireless connection 105 with mobile device 106. Microphone 206 receives first egress audio signals 212, which are then converted into first egress audio data 213 by processing circuit 404. Operation mode selection circuit 406 can forward first egress audio data 213 to first wireless sub-system 402a, which then transmits first egress audio data 213 via two-way wireless connection 105 to mobile device 106. In addition, first wireless sub-system 402a also receives ingress audio data 114 from mobile device 106 via two-way wireless connection 105, and forwards the data to processing circuit 404, which can generate ingress audio signals 216 and drive headphone 208 to output the audio signals.

Referring to FIG. 5B, at time T1, auxiliary device 204 can enter the second operation mode, establish a one-way wireless connection 220 with headset 202, receive second egress audio signals 214, and send second egress audio data 215 to headset 202. Auxiliary device 204 may enter the second operation mode due to, for example, detecting a user action at input interface 430 (e.g., pressing a button to enable microphone 210, a push-to-talk button, etc.) or a user action at input interface 410 (e.g., a user can switch the microphone from a button at the headset or auxiliary device), detecting an orientation change of auxiliary device 204, detecting a voice command, etc.

In addition, at time T1, headset 202 may also enter the second operation mode, and operation mode selection circuit 406 can stop transmission of first egress audio data 213 to first wireless sub-system 402a. Headset 202 may enter the second operation mode based on, for example, second wireless sub-system 402b to start receiving second egress audio data 215, detecting a user action at input interface 410, detecting a voice command, etc. Headset 202 may wait for receiving a requisite amount of second egress audio data 215 before sending the second egress audio data 215 via two-way wireless connection 105 to mobile device 106, to reduce the effect of glitch caused by sudden transition between the playing of first egress audio data 213 and second egress audio data 215. Meanwhile, headset 202 may still receive ingress audio data 114 and output ingress audio signals 216 via headphone 208.

Referring to FIG. 5C, at time T2, after receiving a requisite amount of second egress audio data 215, headset 202 may transmit second egress audio data 215 to mobile device 106 via two-way wireless connection 105. Operation mode selection circuit 406 can forward second egress audio data 215 received from second wireless sub-system 402b to first wireless sub-system 402a for transmission to mobile device 106. In some examples, processing circuit 404 can perform a noise cancellation/reduction operation based on finding differences between first egress audio signals 212 detected by headset 202 and second egress audio signals 214 detected by auxiliary device 204, to generate second egress audio data 215, as described above.

Figure 6A:
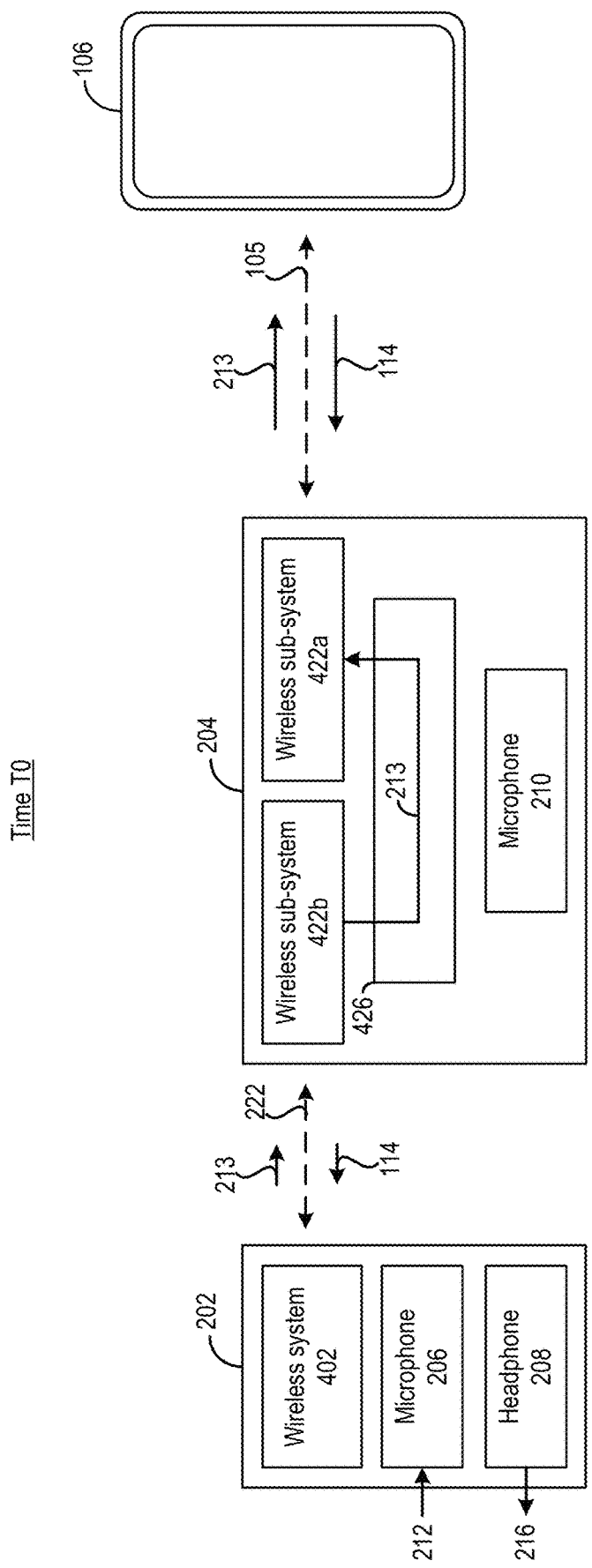
FIG. 6A, FIG. 6B, and FIG. 6C illustrate examples of another sequence of operations of the examples of headset and auxiliary device of FIG. 2A-FIG. 2C, according to some embodiments.
Figure 6B:
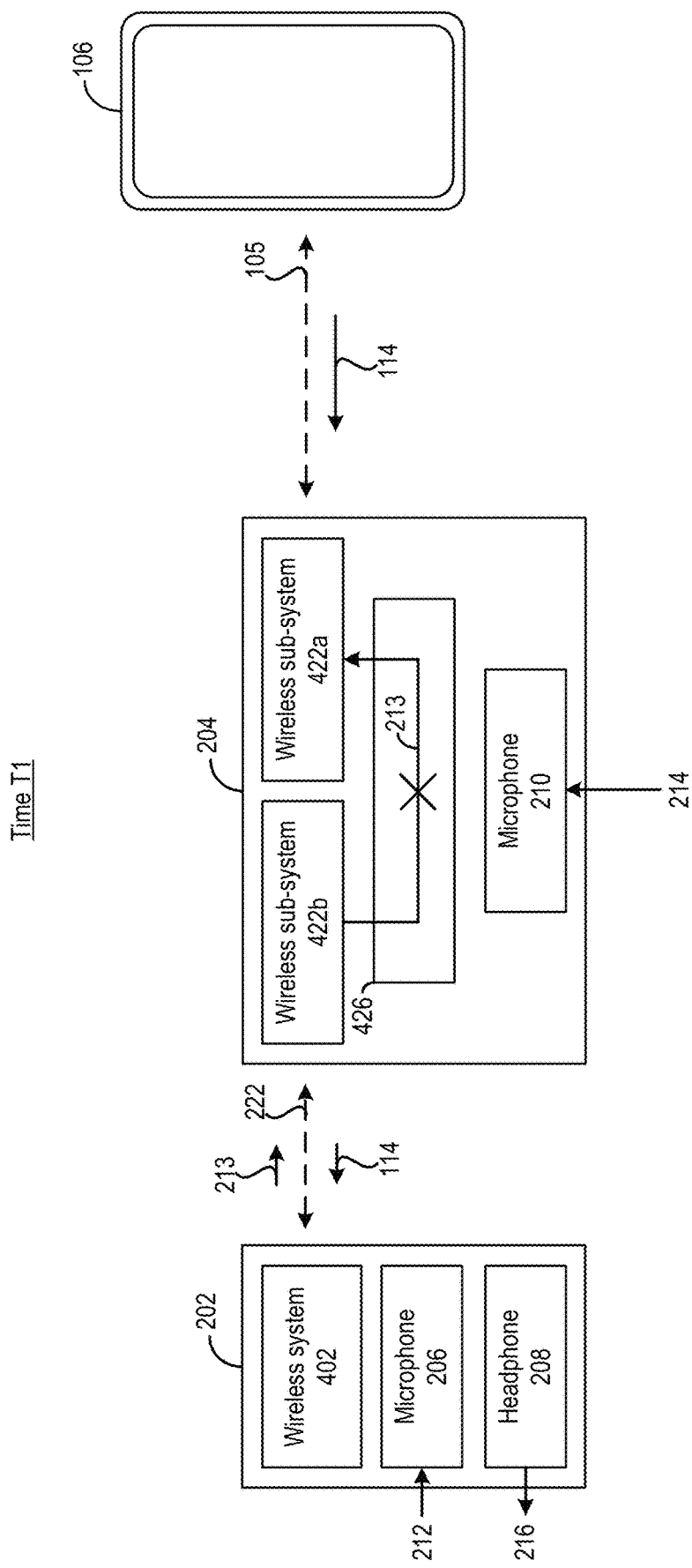
Figure 6C:
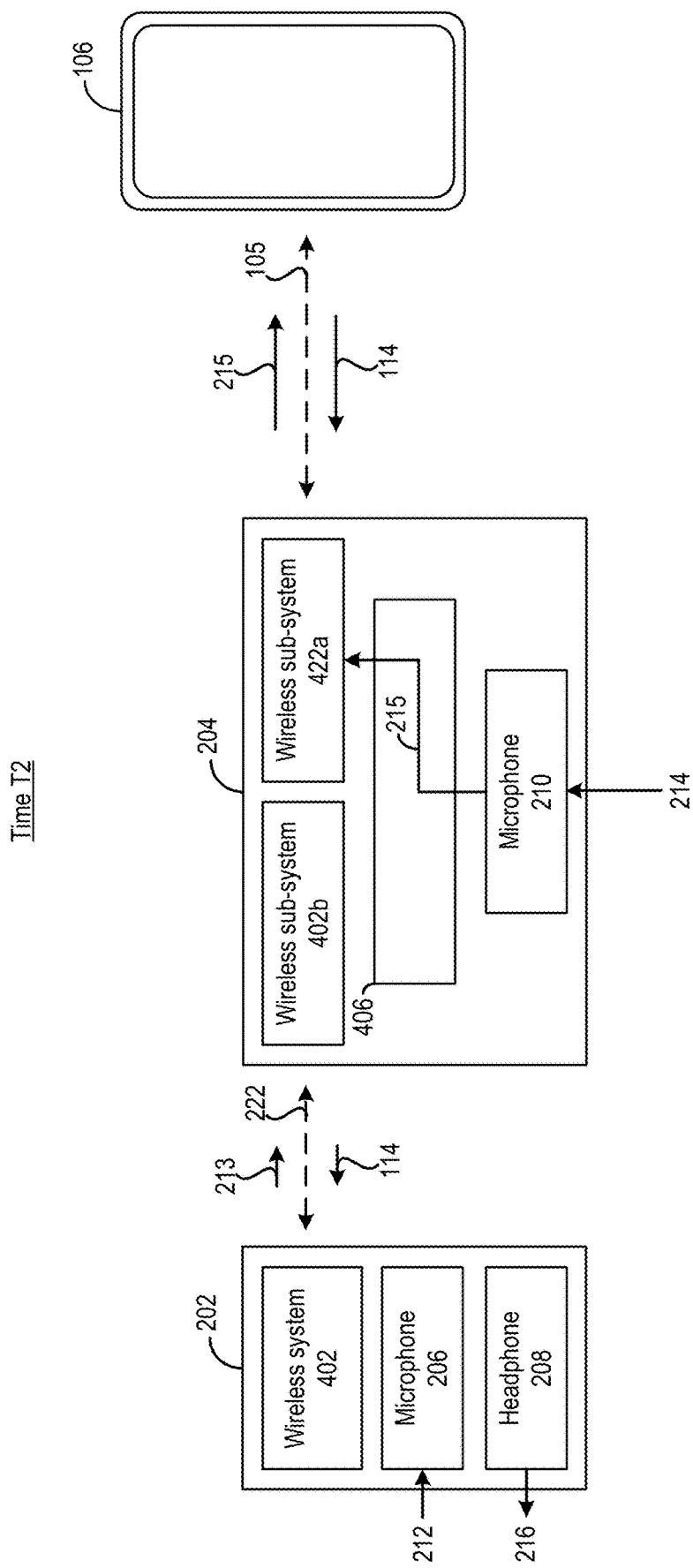

FIG. 6A, FIG. 6B, and FIG. 6C illustrate an example of sequence of mode switching operations of wireless apparatus 200 in which auxiliary device 204 functions as an intermediary/relay.

Referring to FIG. 6A, at time T0, auxiliary device 204 operates in the first operation mode. Auxiliary device 204 establishes two-way wireless connection 105 with mobile device 106 and two-way wireless connection 222 with headset 202. Auxiliary device 204 receives ingress audio data 114 from mobile device 106 via two-way wireless connection 105, and forwards ingress audio data 114 to headset 202 via two-way wireless connection 222. Headphone 208 of headset 202 can output ingress audio signals 216. In addition, microphone 206 of headset 202 can receive first egress audio signals 212. Headset 202 can transmit first egress audio data 213 via two-way wireless connection 222 to auxiliary device 204. While operating in the first operation mode, operation mode selection circuit 426 can receive first egress audio data 213 from second wireless sub-system 422b, and forward to first wireless sub-system 422a, which can then transmit first wireless sub-system 422a to mobile device 106 via two-way wireless connection 105.

Referring to FIG. 6B, at time T1, auxiliary device 204 can receive second egress audio signals 214 and generate second egress audio data 215. Auxiliary device 204 can also enter the second operation mode. As described above, auxiliary device 204 may enter the second operation mode due to, for example, detecting a user action at input interface 430 (e.g., pressing a button to enable microphone 210, a push-to-talk button, etc.) or a user action at input interface 410 (e.g., a user can switch the microphone from a button on the headset or auxiliary device), detecting an orientation change of auxiliary device 204, detecting a voice command, etc.

In addition, at time T1, operation mode selection circuit 426 of auxiliary device 204 can stop transmission of first egress audio data 213 to first wireless sub-system 402a. Auxiliary device 204 may wait for receiving a requisite amount of second egress audio data 215 before sending the second egress audio data 215 via two-way wireless connection 105 to mobile device 106, to reduce the effect of glitch caused by sudden transition between the playing of first ingress audio data 213 and second egress audio data 215. Meanwhile, auxiliary device 204 may still receive ingress audio data 114 from mobile device 106 and forward ingress audio data 114 to headset 202.

Referring to FIG. 6C, at time T2, after receiving a requisite amount of second egress audio data 215, auxiliary device 204 may transmit second egress audio data 215 to mobile device 106 via two-way wireless connection 105. Operation mode selection circuit 426 can forward second egress audio data 215 received from microphone 210 (or in some cases from second wireless sub-system 422b) to first wireless sub-system 422a for transmission to mobile device 106. In some examples, processing circuit 424 can perform a noise cancellation/reduction operation based on finding differences between first egress audio signals 212 (represented by first egress audio data 213) and second egress audio signals 214 received by microphone 210, to generate second egress audio data 215, as described above.

Method

FIG. 7 illustrates a flowchart of a method 700 for detection and transmission of audio signals. FIG. 7 can be performed by wireless apparatus 200 and its components as described in FIG. 2A-FIG. 6C. Referring to FIG. 2A, wireless apparatus 200 can include headset 202, which can be in the form of earbuds or in other forms, and wireless auxiliary device 204. Wireless apparatus 200 can establish a two-way wireless connection with, such as mobile device 106. Via the two-way wireless connection 105, wireless apparatus 200 can transmit egress audio data to be output as egress audio signals by mobile device 106, and receive ingress audio data from mobile device 106.

In step 702, a first wireless system (e.g., first wireless sub-system 402a) of headset 202 can receive ingress audio data, such as ingress audio data 114, the ingress audio data being originated at a mobile device (e.g., mobile device 106). The ingress audio data can be received via wireless connection 105.

In step 704, a headphone (e.g., headphone 208) of headset 202 can output ingress audio signals, such as ingress audio signals 216, based on the ingress audio data. For example, the ingress audio data can be converted using processing circuit 404 (e.g., DAC 404c) into electrical signals, which can drive headphone 208 to output the ingress audio signals.

In step 706, a first microphone (e.g., microphone 206) of headset 202 can receive first egress audio signals, such as first egress audio signals 212. The first egress audio signals can be from the user of headset 202, or from other persons.

In step 708, the first microphone can convert the first egress audio signals into first egress audio data, such as first egress audio data 213. The conversion can be performed using processing circuit 404 (e.g., ADC 404a) of the headset.

In step 710, a second microphone (e.g., microphone 210) of wireless auxiliary device 204 can receive second egress audio signals, such as second egress audio signals 214. The wireless auxiliary device includes a container, such as container case 302, to hold the wireless auxiliary device.

In step 712, the second microphone can convert the second egress audio signals into second egress audio data, such as second egress audio data 215. The conversion can be performed using processing circuit 424 (e.g., ADC 424a) of the wireless auxiliary device.

In step 714, one of headset 202 or wireless auxiliary device 204 can be operated in a first operation mode, comprising selecting the first egress audio signals for transmission to the mobile device, in step 714a, and transmitting, using one of first wireless sub-system 402a of headset 202 or a second wireless system (e.g., first wireless sub-system 422a) of wireless auxiliary device 204, the first egress audio data to the mobile device.

FIG. 5A and FIG. 6A illustrate examples of the first operation mode. Referring to FIG. 5A, in the first operation mode headset 202 can establish two-way wireless connection 105 with mobile device 106. Microphone 206 receives first egress audio signals 212, which are then converted into first egress audio data 213 by processing circuit 404. Operation mode selection circuit 406 can forward first egress audio data 213 to first wireless sub-system 402a, which then transmits first egress audio data 213 via two-way wireless connection 105 to mobile device 106.

Moreover, referring to FIG. 6A, in the first operation mode, auxiliary device 204 establishes two-way wireless connection 105 with mobile device 106 and two-way wireless connection 222 with headset 202. Microphone 206 of headset 202 can receive first egress audio signals 212. Headset 202 can transmit first egress audio data 213 via two-way wireless connection 222 to auxiliary device 204. While operating in the first operation mode, operation mode selection circuit 426 of auxiliary device 204 can receive first egress audio data 213 from second wireless sub-system 422b of auxiliary device 204, and forward to first wireless sub-system 422*a* of auxiliary device 204, which can then transmit first wireless sub-system 422*a* to mobile device 106 via two-way wireless connection 105.

In step 716, one of headset 202 or wireless auxiliary device 204 can be operated in a second operation mode, comprising selecting the second egress audio signals for transmission to the mobile device, in step 716*a*, and transmitting, using one of first wireless sub-system 402*a* of headset 202 or first wireless sub-system 422*a* of wireless auxiliary device 204, the second egress audio data to the mobile device.

FIG. 5C and FIG. 6C illustrate examples of the second operation mode. Referring to FIG. 5C, after receiving a requisite amount of second egress audio data 215, headset 202 may transmit second egress audio data 215 to mobile device 106 via two-way wireless connection 105. Operation mode selection circuit 406 can forward second egress audio data 215 received from second wireless sub-system 402*b* to first wireless sub-system 402*a* for transmission to mobile device 106. In some examples, processing circuit 404 can perform a noise cancellation/reduction operation based on finding differences between first egress audio signals 212 detected by headset 202 and second egress audio signals 214 detected by auxiliary device 204, to generate second egress audio data 215.

Moreover, referring to FIG. 6C, after receiving a requisite amount of second egress audio data 215, auxiliary device 204 may transmit second egress audio data 215 to mobile device 106 via two-way wireless connection 105. Operation mode selection circuit 426 can forward second egress audio data 215 received from microphone 210 (or in some cases second wireless sub-system 422*b*) to first wireless sub-system 422*a* for transmission to mobile device 106. In some examples, processing circuit 424 can perform a noise cancellation/reduction operation based on finding differences between first egress audio signals 212 (represented by first egress audio data 213) and second egress audio signals 214 received by microphone 210, to generate second egress audio data 215.

Operation mode selection circuit 406 of headset 202 can determine whether headset 202 operates in the first operation mode or in the second operation mode. The determination can be based on various ways. For example, the operation mode selection circuit can enter the second operation mode based on the first wireless system receiving the wireless signals including the second egress audio data, or wireless signals including other egress audio data, from the auxiliary device. As another example, the headset may include an input interface, such as a mechanical button, a touch interface, etc., that can detect an action from the user. Based on detecting the action, the operation mode selection circuit can switch between the first operation mode or the second operation mode. As yet another example, the operation mode selection circuit can also extract, from the first egress audio signals or the second egress audio signals, a command to operate in the first operation mode or in the second operation mode, and switch between the first operation mode or the second operation mode based on the command.

Operation mode selection circuit 426 of auxiliary device 204 can determine whether auxiliary device 204 operates in the first operation mode or in the second operation mode. The determination can be based on various ways. For example, the auxiliary device may also include an input interface, such as a mechanical button, a touch interface, etc., that can detect an action from the user. Based on detecting the action, the operation mode selection circuit can switch between the first operation mode or the second operation mode, or switch between transmitting or not transmitting the second egress audio data. With such a configuration, the auxiliary device can operate like a walkie-talkie in which a user can hold the auxiliary device and control when to enable or disable the second microphones and the wireless transmission of the second egress audio signals. For example, the user can enable the second microphones and the wireless transmission of the second egress audio signals when the intended speaker speaks, and disable the second microphones and/or the wireless transmission of the second egress audio signals when the intended speaker is not speaking, so as to transmit audio signals including mostly the user's speech to the mobile device.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. An apparatus comprising:
   a headset including:
   a first wireless system configured to transmit first egress audio data, and to receive ingress audio data, the ingress audio data being originated at a mobile device;
   a first microphone configured to receive first egress audio signals, and to convert the first egress audio signals to the first egress audio data; and a headphone configured to output ingress audio signals based on the ingress audio data;
and
an auxiliary device including:
a container configured to hold the headset;
a second wireless system configured to transmit second egress audio data; and
a second microphone configured to receive second egress audio signals, and to convert the second egress audio signals to the second egress audio data;
wherein the apparatus is further configured to, in a first operation mode:
select the first egress audio signals for transmission to the mobile device; and
transmit, using the first wireless system of the headset or the second wireless system of the auxiliary device, the first egress audio data to the mobile device; and
in a second operation mode:
select the second egress audio signals for transmission to the mobile device; and
transmit, using one of the first wireless system of the headset or the second wireless system of the auxiliary device, the second egress audio data to the mobile device.

2. The apparatus of claim 1, wherein the headset comprises a pair of ear buds.

3. The apparatus of claim 1, wherein the headset is configured to establish a two-way wireless connection with the mobile device using the first wireless system; and
wherein the apparatus further includes an operation mode selection circuit configured to:
in the first operation mode, forward the first egress audio data to the first wireless system of the headset to transmit the first egress audio data to the mobile device via the two-way wireless connection; and
in the second operation mode, forward the second egress audio data to the first wireless system of the headset to transmit the second egress audio data to the mobile device via the two-way wireless connection.

4. The apparatus of claim 3, wherein the headset is configured to:
establish a one-way wireless connection with the auxiliary device using the first wireless system; and
receive, via the one-way wireless connection, the second egress audio data.

5. The apparatus of claim 4, wherein the two-way wireless connection is based on a first wireless protocol; and
wherein the one-way wireless connection is based on a second wireless protocol.

6. The apparatus of claim 5, wherein the operation mode selection circuit of the headset is configured to determine to operate in the second operation mode based on the first wireless system receiving the second egress audio data via the one-way wireless connection.

7. The apparatus of claim 3, wherein the headset includes an input interface configured to detect an action from a user of the headset; and
wherein the operation mode selection circuit is configured to determine whether to operate in the first operation mode or in the second operation mode based on the detected action.

8. The apparatus of claim 7, wherein the input interface comprises at least one of: a mechanical button, or a touch interface.

9. The apparatus of claim 3, wherein the operation mode selection circuit is configured to determine whether to operate in the first operation mode or in the second operation mode based on identifying a voice command in the first egress audio data or the second egress audio data.

10. The apparatus of claim 3, wherein the operation mode selection circuit is a first operation mode selection circuit; and
wherein the auxiliary device further includes a second operation mode selection circuit configured to:
in the first operation mode, disable at least one of: the reception of the second egress audio signals by the second microphone, or the transmission of the second egress audio data by the second wireless system; and
in the second operation mode, enable the reception of the second egress audio signals by the second microphone, and enable the transmission of the second egress audio data by the second wireless system.

11. The apparatus of claim 10, wherein the auxiliary device includes an input interface configured to detecting an action from a user of the headset; and
wherein the second operation mode selection circuit is configured to determine whether to operate in the first operation mode or in the second operation mode based on the detected action.

12. The apparatus of claim 11, wherein the input interface comprises at least one of: a mechanical button, or a touch interface.

13. The apparatus of claim 10, where the auxiliary device includes a gyroscope to determine an orientation of the second microphone; and
wherein the second operation mode selection circuit is configured to determine whether to operate in the first operation mode or in the second operation mode based on the orientation of the second microphone.

14. The apparatus of claim 1, wherein the auxiliary device is configured to:
establish a first two-way wireless connection with the mobile device, and a second two-way wireless connection with the headset, using the second wireless system; and
receive the first egress audio data from the headset via the second two-way wireless connection;
and
wherein the auxiliary device comprises an operation mode selection circuit configured to:
in the first operation mode, forward the first egress audio data to the second wireless system of the auxiliary device to transmit the first egress audio data to the mobile device via the first two-way wireless connection; and
in the second operation mode, forward the second egress audio data to the second wireless system of the auxiliary device to transmit the second egress audio data to the mobile device via the first two-way wireless connection.

15. The apparatus of claim 14, wherein the auxiliary device is configured to:
receive the ingress audio data from the mobile device via the first two-way wireless connection; and
transmit the ingress audio data to the headset via the second two-way wireless connection.

16. The apparatus of claim 14, wherein the auxiliary device includes an input interface configured to detecting an action from a user of the headset, the input interface comprising at least one of: a mechanical button, or a touch interface; and wherein the operation mode selection circuit is configured to determine whether to operate in the first operation mode or in the second operation mode based on the detected action.

17. The apparatus of claim 14, wherein the first two-way wireless connection and the second two-way wireless connection are based on different protocols.

18. A method comprising:
- receiving, using a first wireless system of a headset, ingress audio data, the ingress audio data being originated at a mobile device;
- outputting, using a headphone of the headset, ingress audio signals based on the ingress audio data;
- receiving, by a first microphone of the headset, first egress audio signals;
- converting, by the first microphone, the first egress audio signals to first egress audio data;
- receiving, using a second microphone of an auxiliary device, second egress audio signals, the auxiliary device further including a container to hold the headset;
- converting, by the second microphone, the second egress audio signals to second egress audio data;
- operating at least one of the headset or the auxiliary device in a first operation mode, comprising:
  - selecting the first egress audio signals for transmission to the mobile device; and
  - transmitting, using one of the first wireless system of the headset or a second wireless system of the auxiliary device, the first egress audio data to the mobile device;

and
- operating the at least one of the headset or the auxiliary device in a second operation mode, comprising:
  - selecting the second egress audio signals for transmission to the mobile device; and
  - transmitting, using the one of the first wireless system of the headset or the second wireless system of the auxiliary device, the second egress audio data to the mobile device.

19. The method of claim 18, further comprising:
receiving, using the first wireless system of the headset, the second egress audio data from the auxiliary device,
wherein operating at least one of the headset or the auxiliary device in the first operation mode comprises forwarding, using an operation mode selection circuit of the headset, the first egress audio data to the first wireless system of the headset, to transmit the first egress audio data to the mobile device; and
wherein operating at least one of the headset or the auxiliary device in the second operation mode comprises forwarding, using the operation mode selection circuit of the headset, the second egress audio data to the first wireless system of the headset, to transmit the second egress audio data to the mobile device.

20. The method of claim 18, further comprising:
receiving, using the second wireless system of the auxiliary device, the first egress audio data from the headset,
wherein operating at least one of the headset or the auxiliary device in the first operation mode comprises forwarding, using an operation mode selection circuit of the auxiliary device, the first egress audio data to the second wireless system of the auxiliary device, to transmit the first egress audio data to the mobile device; and
wherein operating at least one of the headset or the auxiliary device in the second operation mode comprises forwarding, using the operation mode selection circuit of the auxiliary device, the second egress audio signals to the second wireless system of the auxiliary device, to transmit the second egress audio data to the mobile device.

\* \* \* \* \*